United States Patent
Nonen et al.

(10) Patent No.: US 12,115,660 B2
(45) Date of Patent: Oct. 15, 2024

(54) CABLE STATUS MANAGEMENT SYSTEM

(71) Applicant: Hitachi Metals, Ltd., Tokyo (JP)

(72) Inventors: Hideki Nonen, Tokyo (JP); Izumi Fukasaku, Tokyo (JP); Ayano Kato, Tokyo (JP); Kei Nishimura, Hitachi (JP); Takahiro Sugiyama, Tokyo (JP); Noriyuki Imai, Tokyo (JP); Takahiro Sato, Tokyo (JP)

(73) Assignee: PROTERIAL, Ltd., Tokyo (JP)

( * ) Notice: Subject to any disclaimer, the term of this patent is extended or adjusted under 35 U.S.C. 154(b) by 276 days.

(21) Appl. No.: 17/834,168

(22) Filed: Jun. 7, 2022

(65) Prior Publication Data
US 2023/0090896 A1  Mar. 23, 2023

(30) Foreign Application Priority Data

Sep. 17, 2021 (JP) ................................. 2021-152404
Apr. 7, 2022 (JP) ................................. 2022-064007

(51) Int. Cl.
*B25J 19/00* (2006.01)
*H01B 7/32* (2006.01)

(52) U.S. Cl.
CPC ................ *B25J 19/00* (2013.01); *H01B 7/32* (2013.01)

(58) Field of Classification Search
CPC .......... B25J 19/00; B25J 19/0025; H01B 7/32
USPC ....................... 324/500, 503, 510
See application file for complete search history.

(56) References Cited

U.S. PATENT DOCUMENTS

| 10,982,399 B1* | 4/2021 | Burks | G01L 5/103 |
| 11,924,591 B2* | 3/2024 | Raza | H04Q 1/13 |
| 2008/0091385 A1* | 4/2008 | Liu | G06F 11/30 |
| | | | 702/187 |
| 2016/0103169 A1* | 4/2016 | Nakajima | G06K 19/0723 |
| | | | 324/538 |

(Continued)

FOREIGN PATENT DOCUMENTS

| CN | 112462746 A | 3/2021 |
| JP | H2-095273 A | 4/1990 |

(Continued)

OTHER PUBLICATIONS

Japanese Office Action, dated Dec. 6, 2022, in Japanese Application No. 2022-064007 and English Translation thereof.

(Continued)

*Primary Examiner* — Giovanni Astacio-Oquendo
(74) *Attorney, Agent, or Firm* — McGinn IP Law Group, PLLC

(57) ABSTRACT

A cable status management system for managing a wire-break progress of a cable used in a managed device is provided with a cable status management device having a cable status storage unit that stores a wire-break progress data indicating the wire-break progress in the cable, a device user-side data management device that belongs to a device user that uses the managed device, a device manufacturer terminal that belongs to a device manufacturer that manufactures the managed device, and a cable manufacturer terminal that belongs to a cable manufacturer that manufactures the cable. At least the device manufacturer terminal and the cable manufacturer terminal are configured to be accessible with the wire-break progress data stored in the cable status storage unit via a network.

9 Claims, 11 Drawing Sheets

(56) References Cited

U.S. PATENT DOCUMENTS

| | | |
|---|---|---|
| 2017/0032281 A1 | 2/2017 | Hsu |
| 2018/0203052 A1 | 7/2018 | Yamamoto |
| 2022/0390927 A1 | 12/2022 | Yamashita et al. |
| 2023/0362330 A1* | 11/2023 | Zhou .................. H04N 21/4122 |
| 2024/0111584 A1* | 4/2024 | Yoo ....................... G06F 9/5027 |

FOREIGN PATENT DOCUMENTS

| | | |
|---|---|---|
| JP | 2007-190663 A | 8/2007 |
| JP | 2012-068171 A | 4/2012 |
| JP | 2018-115992 A | 7/2018 |
| JP | 2020-113165 A | 7/2020 |
| JP | 2021-114116 A | 8/2021 |
| JP | 2021-162570 A | 10/2021 |

OTHER PUBLICATIONS

Japanese Office Action dated May 23, 2023, in corresponding Japanese Patent Application No. 2023-032850, and English translation thereof.

Japanese Office Action, dated Jan. 24, 2023, in Japanese Application No. 2022-086886 and English Translation thereof.

Japanese Office Action dated September 6, 202, in corresponding Japanese Patent Application No. 2022-064007, with an English translation thereof.

Japanese Office Action dated Sep. 6, 2022, in corresponding Japanese Patent Application No. 2022-086886, with an English translation thereof.

* cited by examiner

FIG. 6

CABLE STATUS MANAGEMENT SYSTEM

CROSS-REFERENCE TO RELATED APPLICATIONS

The present patent application claims the priority of Japanese patent application No. 2021-152404 filed on Sep. 17, 2021 and Japanese patent application No. 2022-064007 filed on Apr. 7, 2022, and the entire contents thereof are hereby incorporated by reference.

TECHNICAL FIELD

The present invention relates to a cable status management system.

BACKGROUND ART

For industrial robots installed in production lines in factories or the like, regular maintenances (hereinafter referred to as "routine maintenance") are performed to suppress production lines from being stopped due to sudden failures (see e.g., Patent Literature 1).

In industrial robots, cables are routed through joints, which are moving parts. Such cables are repeatedly bent and twisted in moving parts. Therefore, during the maintenance, the integrity of the cable, i.e., the progress status of wire-breaks (i.e., disconnection of wire, open circuit) in the cable, is examined. The progress status of wire-breaks (hereinafter also referred to as "wire-break progress") in the cable can be determined, for example, by measuring a conductor resistance of the cable.

CITATION LIST

Patent Literature

Patent Literature 1: JP2007-190663A

SUMMARY OF THE INVENTION

By the way, the routine maintenance described above is often performed by robot users using the industrial robots. As a result, robot manufacturers that manufacture the industrial robots and cable manufacturers that manufacture the cables could not know the wire-break progress in the actual devices.

However, failures such as wire-breaks in the cable may cause major damage, such as production line stops. In order to suppress the failure of the industrial robots caused by such cable failures, it is necessary to manage the wire-break progress accurately even from remote locations. In this way, by managing the progress of the wire-breaks graciously, safety measures can be taken, for example, to prompt the cable to be replaced as appropriate in accordance with the wire-break progress, thereby effectively suppressing the failure of the industrial robots due to the cable failures.

Accordingly, it is an object of the present invention is to provide a cable status management system that can manage the wire-break progress and effectively suppress device failures resulting from cable failures.

So as to achieve the above object, one aspect of the present invention provides: a cable status management system for managing a wire-break progress of a cable used in a managed device, comprising:

a cable status management device having a cable status storage unit that stores a wire-break progress data indicating the wire-break progress in the cable;

a device user-side data management device that belongs to a device user that uses the managed device;

a device manufacturer terminal that belongs to a device manufacturer that manufactures the managed device; and a cable manufacturer terminal that belongs to a cable manufacturer that manufactures the cable, wherein at least the device manufacturer terminal and the cable manufacturer terminal are configured to be accessible with the wire-break progress data stored in the cable status storage unit via a network.

Effect of Invention

According to the present invention, it is possible to provide a cable status management system that can manage the wire-break progress and effectively suppress device failures resulting from cable failures.

BRIEF DESCRIPTION OF DRAWINGS

FIG. 6 is a table showing an example of a cable status database.

BEST MODE FOR CARRYING OUT THE INVENTION

Embodiment

Next, the embodiment of the present invention will be explained in conjunction with the appended drawings.

Figure 1:
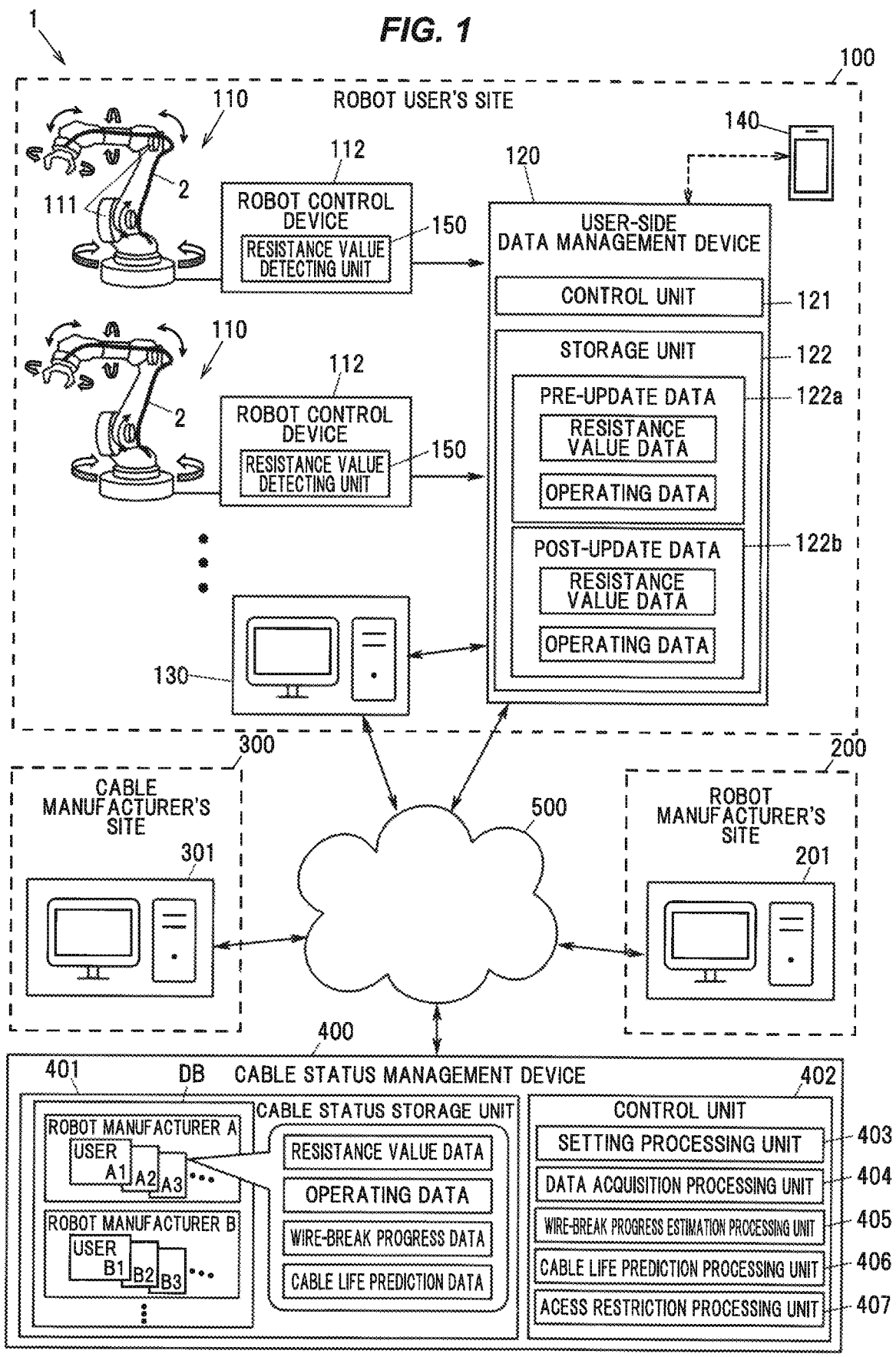
FIG. 1 is a schematic configuration diagram showing a cable status management system according to an embodiment of the present invention.

FIG. 1 is a schematic configuration diagram of a cable status management system according to the embodiment. As shown in FIG. 1, a cable status management system 1 is a system that manages the wire-break progress in a cable 2, which is used as a wiring for a target device to be managed (hereinafter referred to as "managed device").

Here, the case where a device being wired with the cable 2 (namely, managed device) is an industrial robot 110 will be explained. The industrial robot 110 is installed in a factory, etc., and is used in any manufacturing process. The industrial robot 110 includes multiple articulated parts (i.e., joints) 111 as moving parts. A user of the industrial robot 110 is referred to as "robot user" (equivalent to "device user" in the present invention), a manufacturer of the industrial robot 110 is referred to as "robot manufacturer" (equivalent to "device manufacturer" of the present invention), and a manufacturer of the cable 2 is referred to as "cable manufacturer".

(Cable 2)

The cable 2 is a cable for which the progress of the wire-breaks is managed (i.e., managed cable), and also a cable for the moving parts, which is routed through the joint 111 as the moving part of the industrial robot 110. When the joint 111 as the moving part is operated, bending (i.e., flexure) and twisting (i.e., torsion) are applied to the cable 2 according to the movement of the joint 111. The cable 2 is used, e.g., as a power supply line to feed electric power to a device such as a motor for driving the joint 111 of the industrial robot 110 as well as a signal line for unillustrated cameras and sensors installed in the industrial robot 110.

Note that the cable 2 is at least one cable, or two or more cables. For the multiple cables 2, all the cables 2 may be configured as the managed cables, or some of the multiple cables 2 may be configured as the managed cables. For the latter case, it is preferable that a few cables 2 (including one cable) that are likely to be easily broken are selected as "some of the multiple cables" from the two or more cables 2. This configuration minimizes the need for managed cables and reduces the load on the system configuration of the cable status management system 1.

Figure 2:
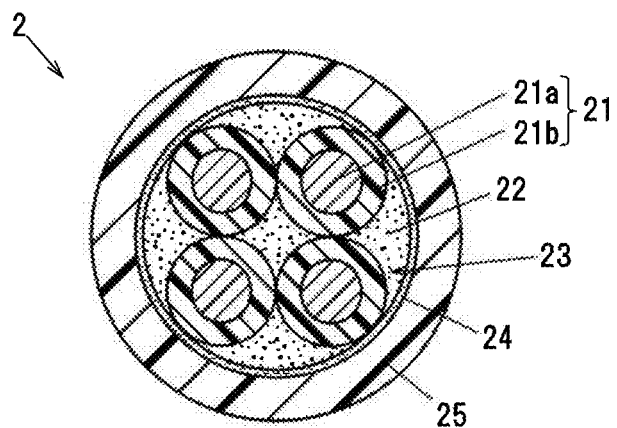
FIG. 2 is a cross-sectional view showing an example of a cross-section perpendicular to a longitudinal direction of a cable.

FIG. 2 is a cross-sectional view showing an example of a cross-section perpendicular to a longitudinal direction of a cable. As shown in FIG. 2, the cable 2 includes a cable core 23 composed of four electric wires 22 and a fibrous filler 22 made of rayon staple fibers, jute threads, or the like, being stranded together, a binding tape 24 helically wrapped around the cable core 23, and a sheath 25 covering around the binding tape 24. Each electric wire 21 includes a conductor 21a comprising a twisted wire conductor with multiple metal strands (elementary wires) made of copper or copper alloys being stranded together, and an insulator 21b covering around the conductor 21a. The configuration shown in FIG. 2 is an example only, and the specific configuration of the cable 2, such as the number of electric wires 21, is not particularly limited. In other words, the electric wire 21 may be one, a few, a few dozen, or more. In the case of using a single electric wire 21, the filler 22, the binding tape 24, and the sheath 25 are often omitted. In this case, the cable 2 means the electric wire 21 per se.

(Method for Estimating the Wire-Break Progress in the Cable 2)

In the present embodiment, a method for estimating the wire-break progress in the cable 2 is explained. If the cable 2 is repeatedly bent (or twisted), wire-breaks will occur in one of the metal strands constituting the conductor 21a. If the cable 2 continues to be bent (or twisted) repeatedly, the number of metal strands that are broken increases gradually. In the present invention, the term "wire-break progress in the cable 2" refers to a ratio showing the extent of broken metal strands constituting the conductor 21a, i.e., the number of the metal strands that are broken with respect to the number of the metal strands constituting the conductor 21a. The wire-break progress in the cable 2 may be indicated by a percentage (%) of the number of metal strands that are broken to a total number of the metal strands.

Such a wire-break progress in the cable 2 can be estimated by measuring the resistance value of the conductor 21a of the cable 2, for example. However, when the number of broken metal strands constituting the conductor 21a is small, the variation in the resistance value is very small, so the noise effect depending on an environmental temperature and an operating condition of peripheral devices (e.g., a servo motor) is greater. Therefore, it may be difficult to accurately determine the wire-break progress in the cable 2 by merely measuring the resistance value of the conductor 21a.

Figure 3:
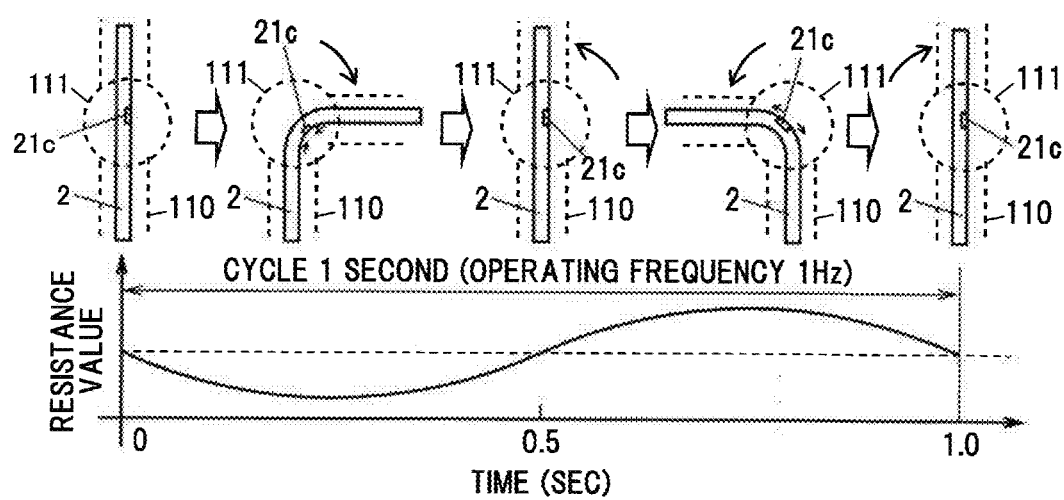
FIG. 3 is an explanatory diagram explaining an estimation of wire-break progress in the cable.

Here, the case where the cable 2 is bent repeatedly at a period (cycle) of 1 second with bending angles of +/−90 degrees, as shown in FIG. 3. In this case, the frequency to operate periodically (hereafter referred to as "operating frequency") is 1 Hz.

If the cable 2 is repeatedly bent, a distance between broken points 21c, 21c of the metal strand in the conductor 21a is periodically deformed according to the flexure, and the resistance value of the conductor 21a varies periodically accordingly. The resistance value of the conductor 21a will vary at a frequency equal to the operating frequency. Therefore, as shown in FIG. 3, the chronological change (i.e., time-series change) in the resistance value of the conductor 21a is detected when the cable 2 is repeatedly operated in a cyclic manner, and the resistance value variation components (i.e., fluctuation components) of the operating frequency are extracted from the detected resistance value data (hereafter referred to as "resistance value data"). Based on the magnitude of the extracted resistance value variation components (the amplitude of the resistance value variation in FIGS. 4A and 4B to be described below), it is possible to estimate as to whether any wire-breaks occur in the metal strands in the conductor 21a of the cable 2. This estimation method is described in detail in JP2021-162570A (Japanese patent application No. 2020-164272) submitted by the same applicant.

The inventors further studied on the above method and confirmed that as the number of metal strands constituting the conductor 21a increases and the number of wire-breaks in the metal strands increases, the resistance value data shows that the variation components of the resistance value at higher order frequencies, i.e., the n-th order (harmonics) of the operating frequency (where n is a natural number of 2 or more), increase as well as those in the operating frequency. The inventors found that this change in the frequency spectrum could be an indicator of the wire-break progress.

Figure 4A:
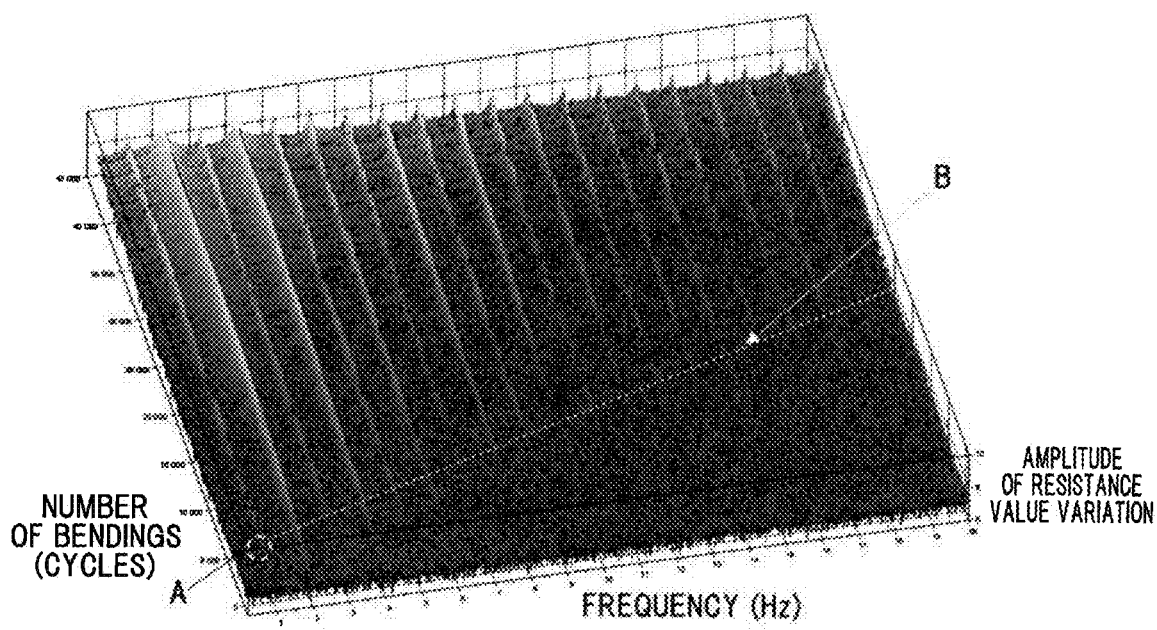
FIGS. 4A and 4B are graphs showing changes in an operating frequency of a resistance value and resistance value variation components of a higher order frequency thereof when the cable is repeatedly bent at the operating frequency of 2 Hz.
Figure 4B:
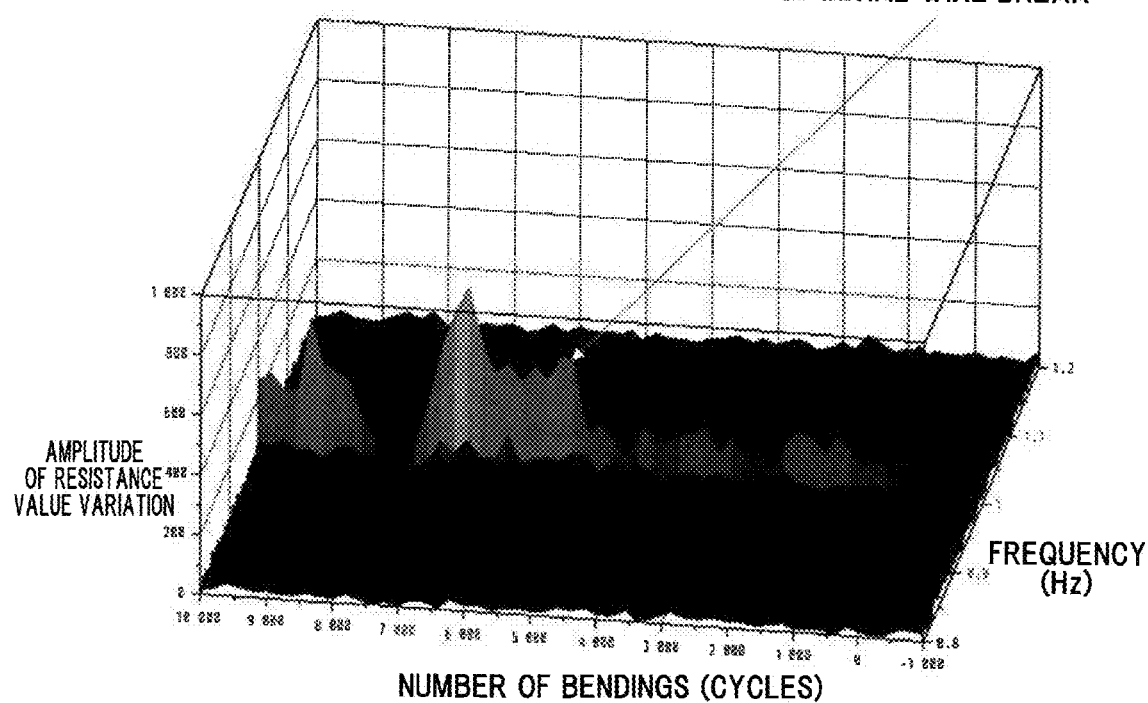

As an example, FIG. 4A shows the change in magnitude of the resistance value variation components and the change in magnitude of the resistance value variation components of its higher order frequencies (2 Hz, 3 Hz, 4 Hz, . . . ) when the flexure is repeated with the operating frequency of 1 Hz. FIG. 4B is an enlarged view of a region A in FIG. 4A. In the examples shown in FIGS. 4A and 4B, it is possible to determine that an initial wire-break has occurred because the magnitude of the resistance value variation components (the amplitude of the resistance value variation) at the operating frequency of 1 Hz has increased rapidly with approximately 5000 bending cycles. In addition, as shown by a dashed line B, the number of bending cycles increases and the number of the broken metal strands constituting the conductor 21a increases. If the wire-break occurs at multiple points in the bending part of the cable 2, the resistance value variation components of the higher order frequency gradually occur from low to high, in proportion to the number of broken wire strands. Also, the resistance value variation components become larger. Therefore, it is possible to estimate the wire-break progress in the cable 2 (i.e., it is possible to determine the number of broken metal strands among the multiple metal strands constituting the conductor 21a), by extracting the magnitude of the resistance value variation components at each higher order frequency of the operating frequency, comparing the extracted magnitude of the resistance value variation components at each higher order frequency with a preset threshold value, and extracting the order of the frequency greater than the threshold value.

When the estimation method is applied to the cable 2 wired in the industrial robot 110, chronological change in the resistance value of the conductor 21a is measured when the joint 111 as the moving part is repeatedly bent (or twisted) in a cyclic manner as the resistance value data. In this case, the resistance value data of conductors 21a of all electric wires 21 in the cable 2 may be acquired (i.e., retrieved), or the resistance value data of a conductor 21a in a specific electric wire 21 (e.g., one of four electric wires 21) may be acquired. In addition, a wire-break (disconnection) detection wire (or a dummy wire) may be installed in the cable 2 to estimate the progress of the wire-break, and the resistance value data of a conductor constituting this wire-break detection wire may be acquired.

Then, the resistance value variation components of the operating frequency and the resistance value variation components of the higher order frequency are extracted from the acquired resistance value data, and based on the magnitude of these resistance value variation components, the wire-break progress in the cable 2 is estimated. The specific method of estimating the wire-break progress in the cable 2 is not limited to the method using the frequency spectrum described above, but it is also possible to use a method of simply measuring the resistance value of the conductor 21a, for example.

(Robot User's Site 100)

Referring again to FIG. 1, the cable status management system 1 includes a robot user's site 100, which belongs to a robot user, a robot manufacturer's site 200, which belongs to a robot manufacturer, a cable manufacturer's site 300, which belongs to a cable manufacturer, and a cable status management device 400 (to be described below), that are configured to be connected to communicate with each other via a network 500 such as the Internet.

The robot user's site 100 has industrial robots 110, a user-side data management device 120 (equivalent to the device user-side data management device of the present invention), a user's terminal (i.e., user terminal), and a user's mobile terminal 140. Each of the industrial robots 110 has a robot control device (robot controller) 112 as a control device for controlling the movement of each joint 111 or the like of the industrial robot 110. The robot control device 112 is composed of a combination of arithmetic elements such as CPU, memory such as RAM and ROM, software, and interfaces, as appropriate.

In the present embodiment, the robot control device 112 is equipped with a resistance value detecting unit 150. The resistance value detecting unit 150 detects the chronological change in the resistance value of the conductor 21a when the moving part (here the joint 111) is repeatedly operated in a cyclic manner. The robot control device 112 has the function to operate the moving part (here the joint 111) of the industrial robot 110 repeatedly in a cyclic manner, according to a pre-set operating sequence for inspection, during the routine maintenance, etc.

In the present embodiment, the robot control device 112, which is attached to the industrial robot 110, is equipped with the resistance value detecting unit 150. However, the resistance value detecting unit 150 may be mounted on an internal board or the like of the industrial robot 110. The resistance value detecting unit 150 should be configured in such a manner that the detected resistance value data can be output to the user-side data management device 120. The resistance value detecting unit 150 being mounted on the robot control device 112 (or the industrial robot 110 itself) eliminates the need to take out a terminal portion of the cable 2 and measure the resistance value, thus improving workability during the routine maintenance. In addition, when the terminal portion of the cable 2 is taken out from the industrial robot 110, the status of the cable 2 is, in the strict sense, different from the status of the cable 2 being wired in the industrial robot 110. Meanwhile, according to the present embodiment, the measurement can be made under the condition where the cable 2 is wired in the industrial robot 110, so that the measurement can be made under the condition closer to the used condition. It is thus possible to accurately estimate the wire-break progress, etc. to be described below.

Figure 5A:
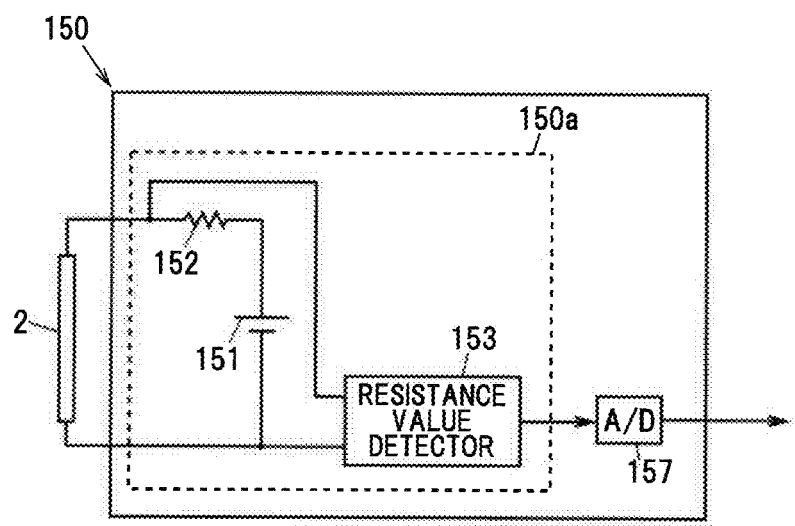
FIGS. 5A and 5B are schematic diagrams showing examples of a resistance value detecting unit.

FIG. 5A is a circuitry diagram showing an example of the resistance value detecting unit 150. The resistance value detecting unit 150 shown in FIG. 5A has a resistance value measuring unit 150a, which measures the resistance value of the conductor 21a of the cable 2, and an A/D converter 157.

The resistance value measuring unit 150a has a direct current (DC) signal source (for example, a DC constant voltage source) 151, an input resistor 152, and a resistance value detector 153. When a DC constant current source is used as the DC signal source 151, the input resistor 152 is not required. The DC signal source 151 applies a DC signal (in this case, DC voltage) to the cable 2 via the input resistor 152. Accordingly, the cable 2 outputs a modulated signal (for example, a voltage signal) that includes the resistance value variation component of the operating frequency as shown in FIG. 3. The resistance value detector 153, for example, detects the chronological change in the resistance value of the conductor 21a by amplifying this modulated signal at a given gain. The chronological change in the resistance value detected by the resistance value detector 153 is output as an output signal from the resistance value detector 153 to the A/D converter 157, which converts the output signal into a digital signal. The resistance value data, which is the data converted into the digital signal, is output to the user-side data management device 120.

Figure 5B:
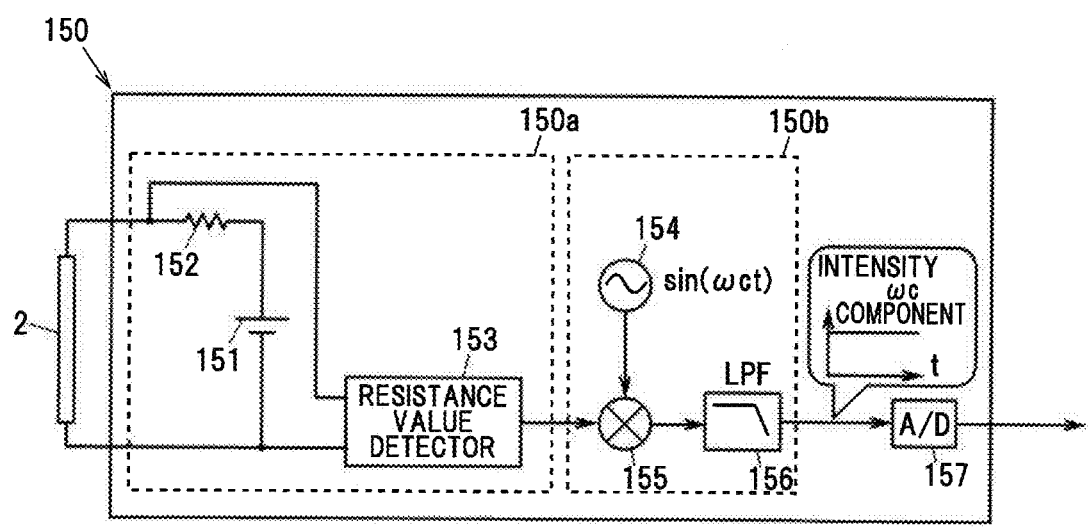

The specific configuration of the resistance value detecting unit 150 is not limited to thereto and can be changed accordingly. For example, the resistance value detecting unit 150 may further comprise a frequency analysis unit 150b between the resistance value measuring unit 150a and the A/D converter 157, as shown in FIG. 5B.

The frequency analysis unit 150b is a so-called lock-in amplifier and has a carrier signal generator 154, a mixer 155, and a low-pass filter 156. As an example, when extracting the resistance value variation components of the operating frequency, the carrier signal generator 154, for example, has a carrier frequency we equal to the operating frequency and generates a carrier signal of the same phase as the variation in the resistance value. By multiplying this carrier signal with the output signal from the resistance value detector 153 (i.e., a synchronous detection), the mixer 155 outputs a signal that is superimposed between the signal of the DC component and the signal of the 2ωc component. The low-pass filter 156 interrupts the signal of 2ωc component from the output signal from mixer 155 and passes only the DC component. The intensity of the signal of this DC component represents the magnitude of the resistance value variation component of the operating frequency. In the carrier signal generator 154 shown in FIG. 5B, when sin (ωct) is ωc=2πf, the resistance value variation component of the operating frequency can be extracted. Having the frequency analysis unit 150b allows the addition of a function of extracting the resistance value variation component of the desired frequency (the resistance value variation component of the operating frequency and the resistance value variation component of the higher order frequency (the resistance value variation component of the n-th order frequency consisting of the carrier frequency of $n\omega c$)) to the resistance value detecting unit 150, thereby eliminating the frequency analysis processing in a wire-break progress estimation processing unit 405 to be described below.

Referring again to FIG. 1, the user-side data management device 120 is configured to manage data (i.e., main data) to estimate the wire-break progress in the cable 2. In the present embodiment, data for estimating the wire-break progress (i.e., main data) in the cable 2 is equivalent to at least the resistance value data being input from the resistance value detecting unit 150 and an operating data of each joint 111 of the industrial robot 110. The user-side data management device 120 is configured to be communicable with the cable status management device 400 (to be described below) via the network 500.

The user-side data management device 120 has a control unit 121, which performs input/output processing of each data including the resistance value data and the operating data, and a storage unit 122. The user-side data management device 120 is composed of combination of arithmetic elements such as CPU, memory such as RAM and ROM, storage device such as hard disk, software, and interfaces, as appropriate.

During the routine maintenance, the control unit 121 acquires the resistance value data from the resistance value detecting unit 150 installed in the robot control device 112. The control unit 121 also acquires the operating data from the robot control device 112 and stores it in a pre-update data storage unit (i.e., data storage unit for storing data before update) 122a of the storage unit 122. It is also preferable to acquire the cumulative operating data from the time of the previous acquisition of the resistance value data to the time of the current acquisition of the resistance value data. The control unit 121, for example, may be configured to acquire the operating data based on a control data for operation control of the industrial robot 110 in the robot control device 112. In this case, the operating data is acquired from the robot control device 112, but the present invention is not limited thereto. For example, a sensor and the like may be provided in the joint 111 of the industrial robot 110. It is also possible to configure the system to acquire the operating data directly from the detection result of the sensor (i.e., not via the robot control device 112). The operating data includes data of the number of bending times and the bending status (e.g., data such as bending radius, bending angle, bending speed), and data of the number of twists and twisting status (e.g., data such as twisting length, twisting angle, and twisting speed) for each joint 111. For example, for the joint 111 configured to bend only, the data of the number of twists and twisting status are optional, and the items of the operating data used for the specific movements of each joint 111 can be set accordingly.

The resistance value data and the operating data may be acquired for each joint 111 (i.e., each moving part) where the cable 2 is wired, or only at one location with the most demanding operating condition. When acquiring the resistance value data for the multiple joints 111, for example, the operating frequency is different for each joint 111. It is also possible to acquire the resistance value data for the multiple joints 111 at once. More details on this will be described below.

The pre-update data storage unit 122a stores main data (the resistance value data and the operating data) before the data update processing is carried out by the cable status management device 400 to be described below. After the data update processing has been performed, the control unit 121 transfers the main data (the resistance value data and the operating data) stored in the pre-update data storage unit 122a to a post-update data storage unit (i.e., data storage unit for storing data after update) 122b. Various main data stored in the post-update data storage unit 122b may be compressed, etc., and the post-update data storage unit 122b may be configured to erase the main data after a certain period of time. For example, the post-update data storage unit 122b may be configured in such a manner that the main data for which a given period of time (e.g., days, months, or years) has not been elapsed since the data was transferred to the post-update data storage unit 122b is stored in the post-update data storage unit 122b, and the main data for which the given period of time has been elapsed is erased from the post-update data storage unit 122b. In this way, the main data stored for a given period can be used as back-up data for the resistance value data and the operating data stored in the cable status storage unit 401 to be described below.

The control unit 121 may also be configured to send an update signal for requesting a data update processing to the cable status management device 400 after acquiring the resistance value data and the operating data. This enables the data update processing by the cable status management device 400 to be performed quickly in accordance with actual data acquisition, thereby enabling smoother operation.

The user's terminal 130 is a terminal device belonging to the robot user, and consisting of e.g., a personal computer. The user's terminal 130 is configured to be communicable with the cable status management device 400 to be described below via the network 500. The user's terminal 130 may be configured to be accessible with the wire-break progress data and the cable life prediction data (hereafter also referred to as "life prediction data") stored in the cable status storage unit 401 of the cable status management device 400 via the network 500. However, as a result of access restriction processing of the cable status management device 400 to be described below, from the user's terminal 130, only the cable 2 relating to the robot user to which the user's terminal 130 belongs (i.e., the cable 2 used in the industrial robot 110 used by the robot user) can access the wire-break progress data and the cable life prediction data. The wire-break progress data and the cable life prediction data used in the industrial robot 110 used by the robot user may be transmitted to the user's terminal 130 via the robot manufacturer's terminal 201 or the cable manufacturer's terminal 301. The user's terminal 130 may also be configured to allow various settings of the user-side data management device 120. It may also be configured to allow viewing of the main data such as the resistance value data stored in the storage unit 122.

The user's mobile terminal 140 is a terminal device belonging to the robot user, and as with the user's terminal 130, it may be configured to allow various settings for the user-side data management device 120. The user's mobile terminal 140 may be configured in such a manner that the main data such as the resistance value data stored in the storage unit 122 can be viewed. Since the user's mobile terminal 140 can be carried by an operator who performs the routine maintenance, having the user's mobile terminal 140 will enable the operator to verify on the spot whether the main data such as the acquired resistance value data is correct or not. The user's mobile terminal 140 may be configured to be accessible with the cable status management device 400 through the user-side data management device 120 or directly via the network 500 to view the wire-break progress data and the cable life prediction data for the cable 2 belonging to the robot user's site 100. This enables the operator to understand the wire-break progress and the cable life of the cable 2 belonging to the robot user's site 100 in a timely manner, thereby making it possible to smoothly replace the cable 2. The user's mobile terminal 140 is not absolutely required and is optional.

In FIG. 1, only one robot user's site 100 is shown, but in practice, the multiple robot user's sites 100 are connected to the network 500. The user-side data management device 120 and the user's terminal 130 belonging to each robot user's site 100 are connected to the cable status management device 400 via the network 500.

(Robot Manufacturer's Site 200)

The robot manufacturer's site 200 belongs to a robot manufacturer that manufactures the industrial robots 110, and has a robot manufacturer's terminal 201. The robot manufacturer's terminal 201 is connected to the cable status management device 400 via the network 500, and is configured to be accessible with the wire-break progress data and the cable life prediction data stored in the cable status storage unit 401 of the cable status management device 400. However, as a result of the restriction of access to the cable status management device 400 to be described below, the robot manufacturer's terminal 201 can access the wire-break progress data and the cable life prediction data, only for the cables 2 of the industrial robots 110 manufactured by the robot manufacturer to which the robot manufacturer's terminal 201 belongs (i.e., the cable 2 for each robot user using the industrial robot 110 manufactured by the robot manufacturer).

In FIG. 1, only one robot manufacturer's site 200 is shown, but in practice, the multiple robot manufacturer's sites 200 are connected to the network 500. The robot manufacturer's terminal 201, which belongs to each robot manufacturer's site 200, is connected to the cable status management device 400 via the network 500. The robot manufacturer's terminal 201 is equivalent to the device manufacturer terminal in the present invention.

(Cable Manufacturer's Site 300)

The cable manufacturer's site 300 belongs to the cable manufacturer that manufactures the cable 2 used in the industrial robot 110, and has a cable manufacturer's terminal 301. The cable manufacturer's terminal 301 is connected to the cable status management device 400 via the network 500, and is configured to be accessible with the wire-break progress data and the cable life prediction data stored in the cable status storage unit 401 of the cable status management device 400.

In the present embodiment, the cable manufacturer's terminal 301 is used as a host terminal. Therefore, in the access restriction processing of the cable status management devices 400 to be described below, the cable manufacturer's terminal 301 is allowed to access to the wire-break progress data and the cable life prediction data of all the robot manufacturers. In other words, the cable manufacturer's terminal 301 can access all the data and all information stored in the cable status storage unit 401. In addition, the cable manufacturer's terminals 301 may be configured to allow various settings for the cable status management device 400 and to send update signals to carry out the data acquisition processing.

(Cable Status Management Device 400)

The cable status management device 400 has a cable status storage unit 401 and a control unit 402 that stores the wire-break progress data, indicating the wire-break progress status of the cable 2. The cable status management device 400 is composed of is composed of combination of arithmetic elements such as CPU, memory such as RAM and ROM, storage device such as hard disk, software, and interfaces, as appropriate. The cable status management device 400 can also belong to any of the following sites: the robot user's site 100, the robot manufacturer's site 200, and the cable manufacturer's site 300, but preferably belongs to the cable manufacturer's site 300 because it is substantially a device controlled by the cable manufacturer.

The control unit 402 of the cable status management device 400 has a setting (i.e., configuration) processing unit 403, a data acquisition processing unit 404, a wire-break progress estimation processing unit 405, a cable life prediction processing unit 406, and an access restriction processing unit 407.

(Setting Processing Unit 403)

The setting processing unit 403 is used to configure various settings for the cable status management device 400. The setting processing unit 403, for example, can set information on various controls, such as a method of data acquisition processing and a configuration of the acquisition time to be processed by the data acquisition processing unit 404. In addition, the setting processing unit 403 permits the recordation (i.e., registration), updating, and deletion and the like of various information stored in the cable status storage unit 401. For example, the following information is stored in the cable status storage unit 401. For entering various information, an unillustrated input device or a cable manufacturer's terminal 301 can be used.

- Product information of the cable 2 (e.g., product number, length, conductor outer diameter, the number of twisted wires, etc.)
- Information of the industrial robot 110 where the cable 2 is used (e.g., type number (model number), identification number and name of the robot manufacturer, etc.)
- Information about the robot user (e.g., identification number, name, location, office information in an industrial robot 110 use area, etc.)
- Host input information to be described below (e.g., the number of confirmed broken wires, presence of anormal data, etc.)

(Data Acquisition Processing Unit 404)

The data acquisition processing unit 404 communicates with the user-side data management device 120 via the network 500 and acquires the resistance value data and the operating data stored in the storage unit 122 (the pre-update data storage unit 122a) of the user-side data management device 120. The acquired resistance value data and operating data are stored in the cable status storage unit 401 (i.e., the database stored in the cable status storage unit 401 is updated). The data acquisition processing unit 404 can be configured to perform the data acquisition processing at a time that is set accordingly, for example, it may be configured to perform the data acquisition processing at a time set daily. In addition, the data acquisition processing unit 404 performs the data acquisition processing in bulk when it receives an update signal from the cable manufacturer's terminal 301 (for example, the data acquisition processing is performed in bulk for all the robot users or the specified robot user). In addition, the data acquisition processing unit 404 may be configured to perform the data acquisition processing for each robot user individually when an update signal is received from the user-side data management device 120 belonging to each robot user's site 100.

(Wire-Break Progress Estimation Processing Unit 405)

The wire-break progress estimation processing unit 405 estimates the wire-break progress in the cable 2 based on the resistance value data acquired by the data acquisition processing unit 404. In the present embodiment, the wire-break progress estimation processing unit 405 estimates the wire-break progress in the cable 2 at least based on the amplitude of the resistance value variation component of the operating frequency in the resistance value data where the operating frequency is a frequency for repeatedly operating the moving part of the joint 111 in a cyclic manner.

More specifically, the wire-break progress estimation processing unit 405 first perform a frequency analysis of the resistance value data, and then performs a frequency analysis processing to extract the resistance value variation component of the operating frequency and the variation components of the higher order frequency which is the n-times the operating frequency. Thereafter, the wire-break progress estimation processing unit 405 estimates whether or not the wire-break occurs in the conductor 21a of the cable 2, and estimates how much of the metal strands are broken, based on the magnitude of the resistance value variation component of the extracted operating frequency and the magnitude of the resistance value variation component of the higher order frequency which is the n-times the operating frequency. For example, it is estimated that the wire-break occurred when the magnitude of the operating frequency variation component is greater than a threshold value. For example, the wire-break progress is estimated by comparing each magnitude of the resistance value variation components at the higher order frequencies with the threshold, and confirming the order number of the higher order frequency of the operating frequency in which the magnitude of the resistance value variation component is greater than the threshold. The wire-break progress estimation processing unit 405 stores the estimated results in the cable status storage unit 401, as the wire-break progress data.

For example, when the operating frequency is varied for each joint 111 in order to acquire the resistance value data for the multiple joints 111 in bulk, as described above, the magnitude of the resistance value variation component (each resistance value variation component of the operating frequency and its higher order frequency) corresponding to the operating frequency of each joint 111 will be acquired, and the wire-break progress at each joint 111 will be estimated based on the acquired magnitude of each resistance value variation component. The present invention is not limited to the specific method of estimating the wire-break progress by the wire-break progress estimation processing unit 405. For example, it is possible to simply measure the resistance value of the conductor 21a and estimate the wire-break progress in the cable 2 based on the measurement results.

The timing of estimating the wire-break progress in the cable 2 by the wire-break progress estimation processing unit 405 can be set as appropriate. For example, the wire-break progress estimation processing unit 405 can be configured to estimate the wire-break progress in the cable 2 with the data being updated after the data acquisition processing unit 404 has performed the data acquisition processing (i.e., after the database stored in the cable status storage unit 401 has been updated).

Here, the case where the wire-break progress estimation processing unit 405 is installed in the cable status management device 400 is explained. The present invention is not limited thereto, and the wire-break progress estimation processing unit 405 may be installed in the cable manufacturer's terminal 301 as the host terminal. In this case, the wire-break progress estimation processing unit 405 in the cable manufacturer's terminal 301 acquires the resistance value data from the cable status management device 400 via the network 500, estimates the wire-break progress based on the acquired resistance value data, and transmits the wire-break progress data which is the result of the estimation to the cable status management device 400 to be stored in the cable status storage unit 401.

(Cable Life Prediction Processing Unit 406)

The cable life prediction processing unit 406 performs machine learning based on the operating data acquired by the data acquisition processing unit 404 and the wire-break progress data estimated by the wire-break progress estimation processing unit 405 to predict the life of the cable 2. More specifically, the cable life prediction processing unit 406 includes software such as learning algorithm or the like for self-learning by machine learning the correlation of the wire-break progress data with respect to each parameter included in the operating data (e.g., the bending status, such as the number of bending times and the bending angle). The learning algorithms are not limited in particular, and the publicly known learning algorithms can be used, for example, neural networks of three or more layers, so-called deep learning may be used. What the cable life prediction processing unit 406 learns is a model structure showing the correlation between the operating data the joint 111 as the moving part (i.e., the bending and twisting condition of the cable 2) and the wire-break progress in the cable 2.

The cable life prediction processing unit 406 iterates learning based on data sets, including a description variable (the operating data) and an objective variable (the wire-break progress data), based on the operating data and the wire-break progress data, and automatically interprets the correlation between the two data. At the start of the learning, the correlation is unknown, but as the learning progresses, the correlation of the objective variable (the wire-break progress data) to the description variable (the operating data) is gradually interpreted, and the correlation of the objective variable (the wire-break progress data) to the description variable (the operating data) can be interpreted using the resulting learned model.

Based on the learned model, the cable life prediction processing unit 406 predicts the descriptive variable (the operating data) for which the objective variable (the wire-break progress data) reaches a preset life set value (a value of the wire-break progress data, which determines that the conductor 21a has broken) based on the learned model, and takes into account a past usage status of the industrial robot 110 (driving frequency of the joint 111), and the like to predict when the end of life will be reached, i.e., the cable life. The term "cable life" refers to the time when the wire-break progress data (the percentage of the broken metal strands in the conductor 21A) reaches the wire-break ratio, which is determined to be a predetermined life. The cable life predicted by the cable life prediction processing unit 406 is stored in the cable status storage unit 401 as a cable life prediction data.

In this case, the wire-break progress data (i.e., the percentage of the broken metal strands in the conductor 21a) was used as the objective variable. However, the present invention is not limited thereto, and it is enough to use a variable by which the wire-break of the conductor 21*a* can be predicted, for example, it is possible to use the magnitude of a particular frequency component in the resistance value data (the variable component of the operating frequency or of each resistance value of the n-th order frequency), or simply to use the resistance value of the conductor 21*a*. For example, the "predetermined cable life" referred to in the present application is set to a status where the increase in the resistance value of the conductor 21*a* constituting the cable 2 is greater than 20% (the rate of increase in the resistance value relative to the initial resistance value of the conductor 21*a*), and the wire-break progress (the percentage of the broken metal strands in the conductor 21*a*) at this stage is e.g., 80% or more (=the percentage of the wire-breaks that are considered to be the end of life).

In addition, the "percentage of the wire-breaks that are considered to be the end of life" used to predict the life may be set differently for each cable 2, each industrial robot 110, each robot user, or each robot manufacturer. This enables, for example, the "percentage of the wire-breaks that are considered to be the end of life" to be reduced to the safety side, especially for the industrial robots 110 that require a large safety margin, and allows the user to set a safety margin for each cable 2 to be managed separately.

In the present embodiment, the case where the cable life prediction processing unit 406 is installed in the cable status management device 400 is explained. However, the present invention is not limited thereto. The cable life prediction processing unit 406 may be installed in the cable manufacturer's terminal 301 as the host terminal, as well as the wire-break progress estimation processing unit 405. In this case, the cable life prediction processing unit 406, installed in the cable manufacturer's terminal 301, acquires the operating data from the cable status management device 400 via the network 500, and also acquires the wire-break progress data from the devices equipped with the wire-break progress estimation processing unit 405. The cable life is predicted based on the acquired operating data and the acquired wire-break progress data. The resulting cable life prediction data will be sent to the cable status management device 400 and stored in the cable status storage unit 401.

(Access Restriction Processing Unit 407)

In the cable status management system 1 according to the present embodiment, the multiple user's terminals 130, the multiple robot manufacturer's terminals 201, and the cable manufacturer's terminal 301 are configured to be accessible with the wire-break progress data and the cable life prediction data stored in the cable status storage unit 401. However, it may be problematic, for example, to disclose technical data of the industrial robots 110 relating to other robot manufacturers to any robot manufacturer. Therefore, in the present embodiment, the access restriction processing unit 407 is configured to permit the robot user, robot manufacturer, and cable manufacturers have different access levels and limit access to data that is not required.

More specifically, for each robot manufacturer's terminal 201, the access restriction processing unit 407 will perform access restriction in such a manner that only the wire-break progress data and the cable life prediction data of the cable 2 for the industrial robots 110 manufactured by the robot manufacturer to which the robot manufacturer's terminal 201 belongs are accessible. For each user's terminal 130, the access restriction processing unit 407 will restrict access in such a manner that only the wire-break progress data and cable life prediction data of the cable 2 for the industrial robot 110 used by the robot user to which the user's terminal 130 belongs are accessible.

For the cable manufacturer's terminal 301, the access restriction processing unit 407 does not perform the access restriction. In other words, the access restriction processing unit 407 permits the cable manufacturer's terminals 301 to access the wire-break progress data and the cable life prediction data from all robot manufacturers.

The access restriction processing unit 407 may be configured to identify an access source (i.e., connection source) by an IP address, i.e., to which robot user the accessing user's terminal 130 belongs, to which robot manufacturer the accessing robot manufacturer's terminal 201 belongs, or to which cable manufacturer the accessing cable manufacturer's terminal 301 belongs. It is also possible to require the user to enter an ID and a password when accessing the cable status management device 400, and to determine the access source from the ID entered. The access restriction processing unit 407, based on the specified access source, allows access only to an information pertaining to the robot user if the access source is the robot user (the user's terminal 130), and only to an information pertaining to the robot manufacturer if the access source is the robot manufacturer (the robot manufacturer's terminal 201), but all information shall be accessible if the access source is the cable manufacturer (the cable manufacturer's terminal 301). For example, the access restriction processing unit 407 is configured to extract accessible information according to the information of the robot user (name, identification number, etc.) in the cable status database DB to be described below, and the information of the robot manufacturer (name, identification number, etc.), and provide the accessible information to the access source.

(Other Elements of the Cable Status Management Device 400)

Although not shown, the cable status management device 400 may have a warning unit that generates a warning for at least one of the robot user using the cable 2, the robot manufacturer, and the cable manufacturers, when the estimated wire-break progress data of the cable 2 is greater than a predetermined value. For example, the warning unit sends a warning signal to the user's terminal 130, the robot manufacturer's terminal 201, and the cable manufacturer's terminal 301, or sends an e-mail to an e-mail address that has been previously registered, as an issuance of the warning. The warning unit may be configured to alert if an estimated period until the end of life of the cable 2 from the current status is not more than a predetermined number of days.

In addition, the cable status management device 400 may have an additional cryptographic communication processing unit that encrypts the communication between the cable status management device 400 and each terminal 130, 201, and 301. The cryptographic communication processing unit, for example, performs encryption processing that can only be encoded/decoded by the robot users, the robot manufacturers and the cable manufacturer.

The cable status management device 400 may have a reset processing unit to perform a reset processing of storing an information of replacement of a managed cable that was connected to a managed device in the cable status storage unit 401, when the managed cable (the cable 2 in this case) that is wired in the managed device (the industrial robot 110 in this case) with a new managed cable based on the wire-break progress data and the cable life prediction data. At least when the managed cable that was wired in the managed device is replaced with the new managed cable, the reset processing unit stores the information that the managed cable that has been wired in the managed device was already replaced as a replacement information in the cable status storage unit 401.

During the reset process, it is preferable to keep each data relating to the managed cable that was wired in the managed device before the replacement as an old data without deleting it from the cable status storage unit 401. By keeping the old data stored in the cable status storage unit 401, it can be used for machine learning, etc., to acquire the wire-break progress data and the cable life prediction data for the managed cable newly wired in the managed device and other managed cables already wired in the managed device.

After the reset processing has been performed at the reset processing unit, it is preferable that the setting processing is carried out with respect to the managed cable newly wired in the managed device.

(Cable Status Database DB)

In the cable status storage unit 401, various data on all the cables 2 for which the cable status is managed are integrated and stored into a single database for storage. Hereinafter, this database is referred to as the cable status database DB. An example of the cable status database DB is shown in FIG. 6.

Figure 6:
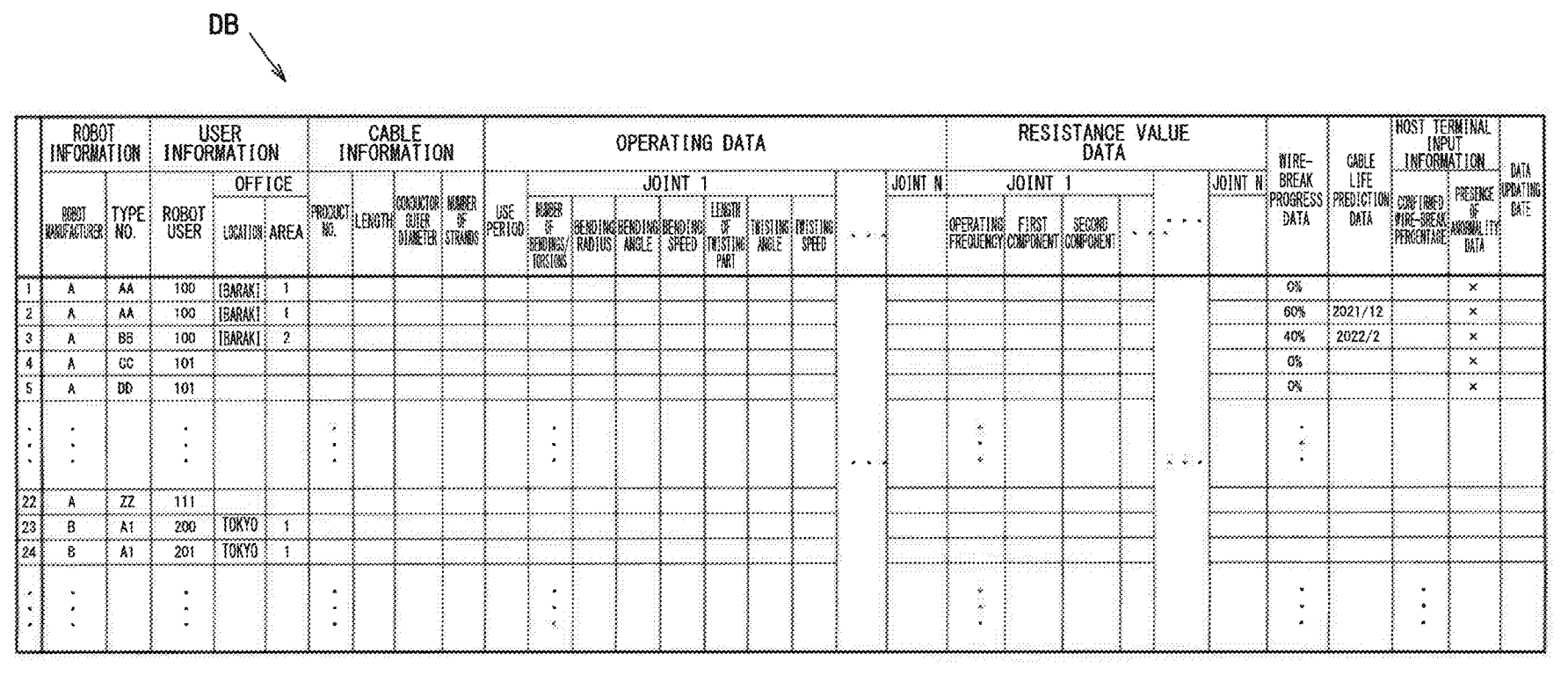

As shown in FIG. 6, the cable status database DB is a database storing the data about all the cables 2 for which the cable status is managed, including robot information, user information, cable information, operating data, resistance value data, wire-break progress data, cable life prediction data, host terminal input information, data update date, etc.

The robot information is the information about the industrial robot 110 to which the cable 2 is applied, including the information about the robot manufacturer (name, identification number, etc.) and the type number (i.e., model number) of the industrial robot 110. The user information is the information about the robot user who is using the industrial robot 110, including the information about the robot user per se (name, identification number, etc.), and the information about the office where the industrial robot 110 is used (location, area of use, etc.).

The cable information is the information about the cable that is wired in the industrial robot 110 (=managed device), i.e., the cable 2 (=managed cable) that is to be managed, including the product number, length, conductor outer diameter, number of strands in the conductor 21a, etc. If two or more electric wires 21 of the cable 2 are managed, the cable information may include the information to identify the electric wire 21 (such as wire number and color of the insulator 21b). In addition, if two or more cables 2 in the industrial robot 110 are managed, the cable information may include the information to identify the cable 2 (cable number, color of the sheath 25, etc.).

The operating data is the operating information of the moving part to be managed and is used to predict the cable life. The operating data is the information acquired from the data management device 120 on the user's side (i.e., user-side data management device 120). The operating data includes, for each joint 111 to be managed, the operating information such as the number of bending/twisting times, bending radius, bending angle, bending speed, length of the twisting part, twisting angle, and twisting speed. Note that the illustrated example shows the case where the multiple joints 111 are managed for one cable 2, but the joint 111 to be managed may be a single joint. The operating data may also include the information on the date and time of acquisition of the operating data.

The resistance value data is the information about the resistance value of the conductor 21a of the cable 2 and is used to estimate the wire-break progress. The operating data is acquired from the user-side data management device 120. The resistance value data includes, for each joint 111 to be managed, the operating frequency, resistance value variation component of the operating frequency (first component (harmonic)), and the resistance value variation component of the operating frequency (n-th order component (nth harmonic), n is a natural number greater than or equal to 2). Although not shown in FIG. 6, the resistance value data may preferably include the history of the values of respective variation components of the resistance value data. In addition, the resistance value data may include the actual measurement data detected at the resistance value detecting unit 150 (actual measurement data per se, or information such as links to files and file names of the actual measurement data). In addition, the resistance value data may include the information on the date and time of the acquisition of the resistance value data.

The wire-break progress data is the data of wire-break progress in the cable 2 as estimated by the wire-break progress estimation processing unit 405, more specifically, the percentage of the wire-breaks in the conductor 21a as estimated by the wire-break progress estimation processing unit 405. For example, if the wire-break progress data is 50%, it is estimated that half of the metal strands constituting the conductor 21a are broken. Although not shown, the wire-break progress data may include the information on the estimated time and date of the wire-break progress in the cable 2.

The cable life prediction data is the data of a life span of the cable 2 (cable life) predicted by the cable life prediction processing unit 406, and it is an information indicating when the wire-break ratio, which is determined to be a predetermined life, is reached. Therefore, the cable life prediction data provides a guide to prompt the replacement of the cable 2. Although not shown, the cable life prediction data may include the information on the date and time when the cable life was predicted. In addition, if the "percentage of the wire-breaks that are considered to be the end of cable life" is set to a different ratio for each cable 2 (or, for each industrial robot 110, for each robot user, for each robot manufacturer), the cable life prediction data may include information on the "percentage of the wire-breaks that are considered to be the end of life" which was used to predict the cable life.

The host terminal input information is the information entered from the cable manufacturer's terminal 301 as the host terminal and includes the information such as the results of maintenance when the cable manufacturer performs detailed maintenance, and whether the abnormality was confirmed or not when the data was checked by the cable manufacturer. In the present embodiment, the host terminal input information includes information on the number of confirmed wire-breaks, which is the number of wire-breaks actually confirmed during the maintenance, and the presence or absence of any anormal data. Having the information on the number of confirmed wire-breaks, for example, makes it possible to verify that the estimation of the wire-break progress data is carried out accurately. Further, having the information on the presence or absence of the anormal data makes it possible, for example, to suppress the use of data such as the resistance value and the like of the cable 2 in mechanical learning by the cable life prediction processing unit 406, if it includes the anormal data. Note that the host terminal input information is not limited to the items shown in the table, but other items may be included as appropriate.

Thus, in the present embodiment, the cable status management device 400 has the cable status database DB, in which the operating data of the moving part (joint 111) where the cable 2 is routed, and the resistance value data, the wire-break progress data and the cable life prediction data of the cable 2 are integrated as a database for each robot user and for each robot manufacturer.

In order to accurately predict the life span (cable life) of the cable 2, a lot of data are required. Conventionally, in many cases, the data during the maintenance and the like are only managed by the robot user, which makes it difficult to collect a lot of data. For example, the robot manufacturers and the cable manufacturers may collect a lot of data by traveling to maintain the industrial robots 110, but it was not practical with considering the complexity and cost. In contrast, according to the present embodiment, a lot of data can be integrated into the cable status database DB by linking the operating data with the resistance value data, thereby improving the predictability of the cable life for the cable 2.

(Control Flow)
(Main Routine)

Figure 7:
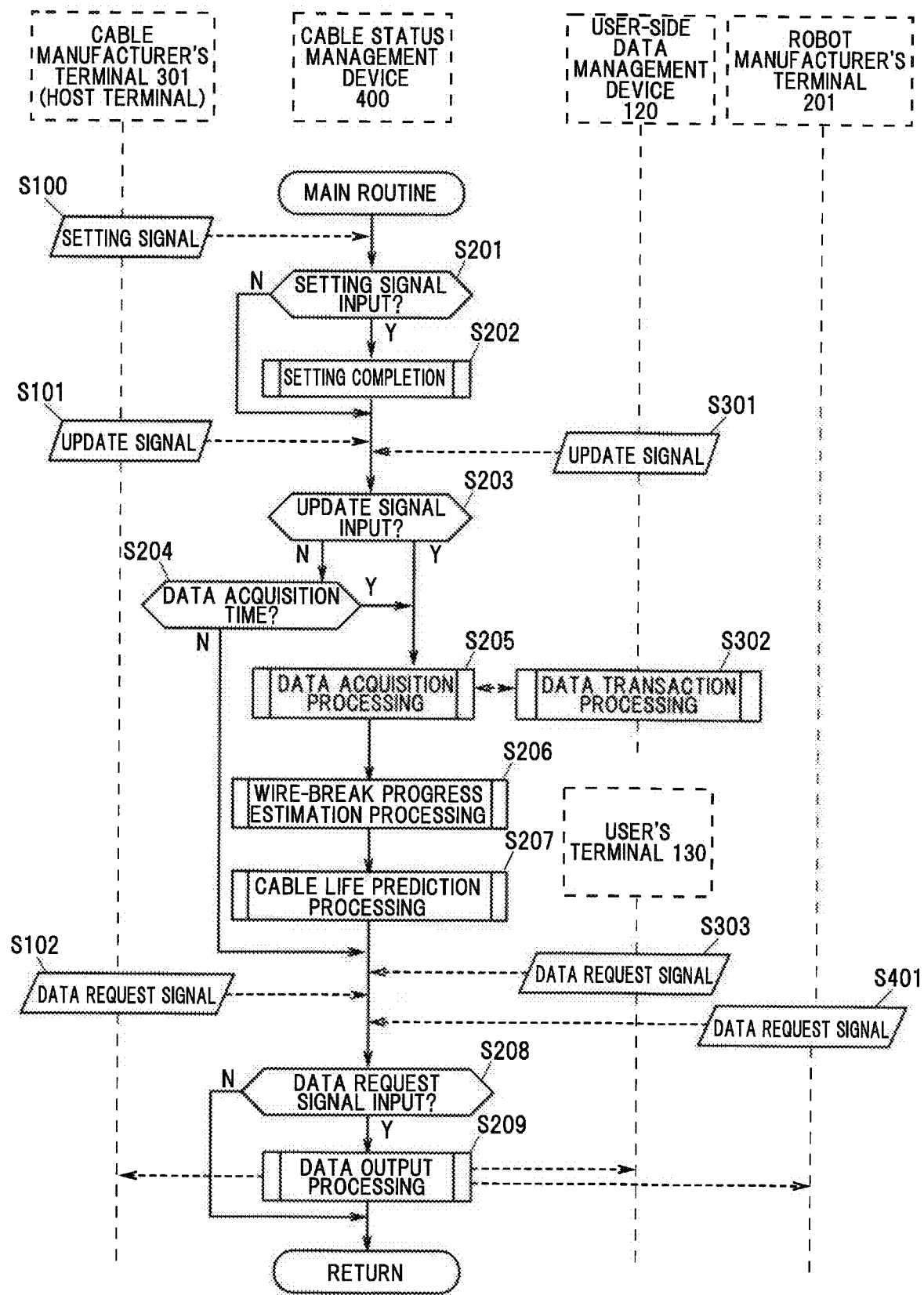
FIG. 7 is a flowchart showing a control flow of the cable status management system.

FIG. 7 is a flowchart showing the control flow in the cable status management system 1. Note that in FIGS. 7 and 8 to 12, the arrows shown with a solid line represent the flow of control, and the arrows shown with a dashed line represent the input/output of the signal or data. As shown in FIG. 7, the cable manufacturer's terminal 301 sends a setting signal to the cable status management device 400 when setting a data acquisition time, which is the time for performing the data acquisition processing and entering the host terminal input information and the like (step S100). The cable status management system 1 determines if the setting signal has been entered in step S201. If it is determined to be YES (Y), it will perform the setting processing (configuration processing) in step S202. The setting processing will be described in detail below. If it is determined to be NO (N) in step S201, the flow proceeds to step S203.

The cable manufacturer's terminal 301 sends an update signal to the cable status management device 400 when updating resistance and operating data (step S101). In addition, the user-side data management device 120 sends an update signal to the cable status management device 400 after acquiring the resistance value data and the operating data (step S301). In step S203, the data acquisition processing unit 404 of the cable status management device 400 determines if the update signal has been entered. If it is determined to be YES in step S203, the data acquisition processing is performed in step S205, then the flow proceeds to step S206. Details of the data acquisition processing will be described below. If it is determined to be NO in step S203, it determines whether the current time is the data acquisition time or not in step S204. If it is determined to be YES in step S204, the data acquisition processing is performed in step S205, then the flow proceeds to step S206. If it is determined to be NO in step S204, the data acquisition process, etc. is skipped, and then the flow proceeds to step S208. Note that this is a case of controlling the data acquisition processing to be performed every day at the time of data acquisition, but step S204 is optional. If step S204 is omitted, the flow may proceed to step S208 when it is determined to be NO in step S203.

Then, in step S206, the wire-break progress estimation processing is performed, and in step S207, the cable life prediction processing is performed sequentially, and then the flow proceeds to step S208. Details of the wire-break progress estimation processing and the cable life prediction processing will be described below. In this case, it is configured to perform the wire-break progress estimation processing and the cable life prediction processing when performing the data acquisition processing. For example, it may be possible to carry out the wire-break progress estimation processing and the cable life prediction processing as appropriate, depending on the input of an instruction signal from the cable manufacturer's terminal 301.

The cable manufacturer's terminal 301 sends a data request signal to the cable status management device 400 when checking the wire-break progress and the cable life of the cable 2 (step S102). Similarly, the user's terminal 130 and the robot manufacturer's terminal 201 send a data request signal to the cable status management device 400 when checking the wire-break progress and the cable life of the cable 2 (steps S303, S401). The robot user may send the data request signal from the user's mobile terminal 140 to the cable status management device 400.

In step S208, the cable status management device 400 determines if the data request signal has been entered. If it is determined to be YES in step S208, data output processing is performed in step S209 and then the flow returns. Details of the data output processing will be described below. If it is determined to be NO in step S208, the flow returns without performing the data output processing in step S209.

Figure 8:
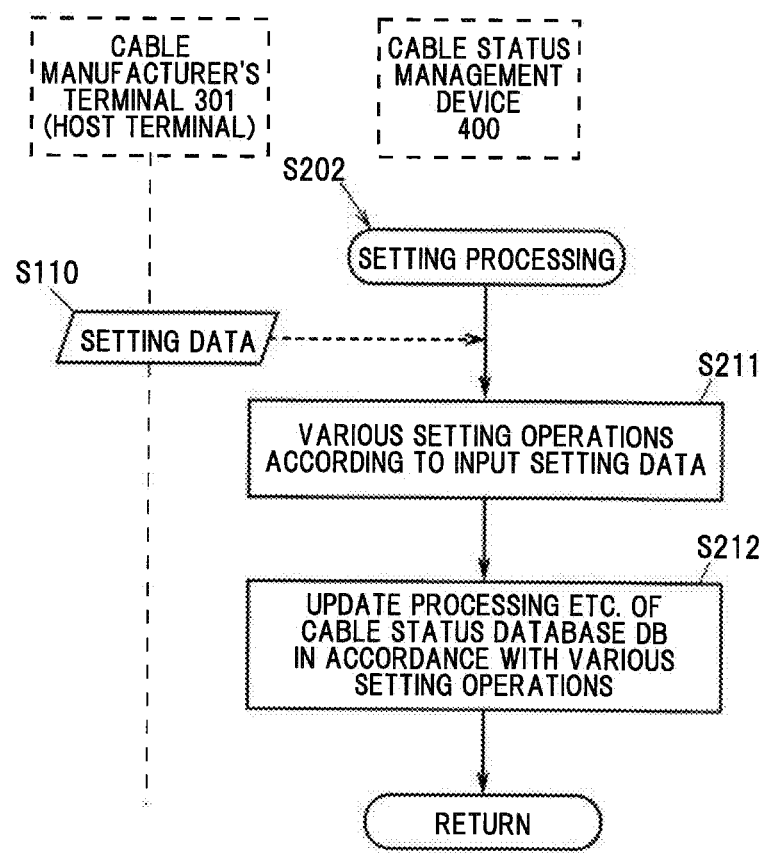
FIG. 8 is a flowchart of a setting processing.

(Setting Processing) As shown in FIG. 8, during the setting processing in step S202, the setting data entered at the cable manufacturer's terminal 301 is first sent from the cable manufacturer's terminal 301 to the cable status management device 400 (step S110). The setting processing unit 403 of the cable status management device 400 performs various settings in accordance with the setting data being received (step S211). Following the various settings in step S211, update processing or the like of the cable status database DB is performed accordingly (step S212) and the flow returns.

(Data Acquisition Processing)

Figure 9:
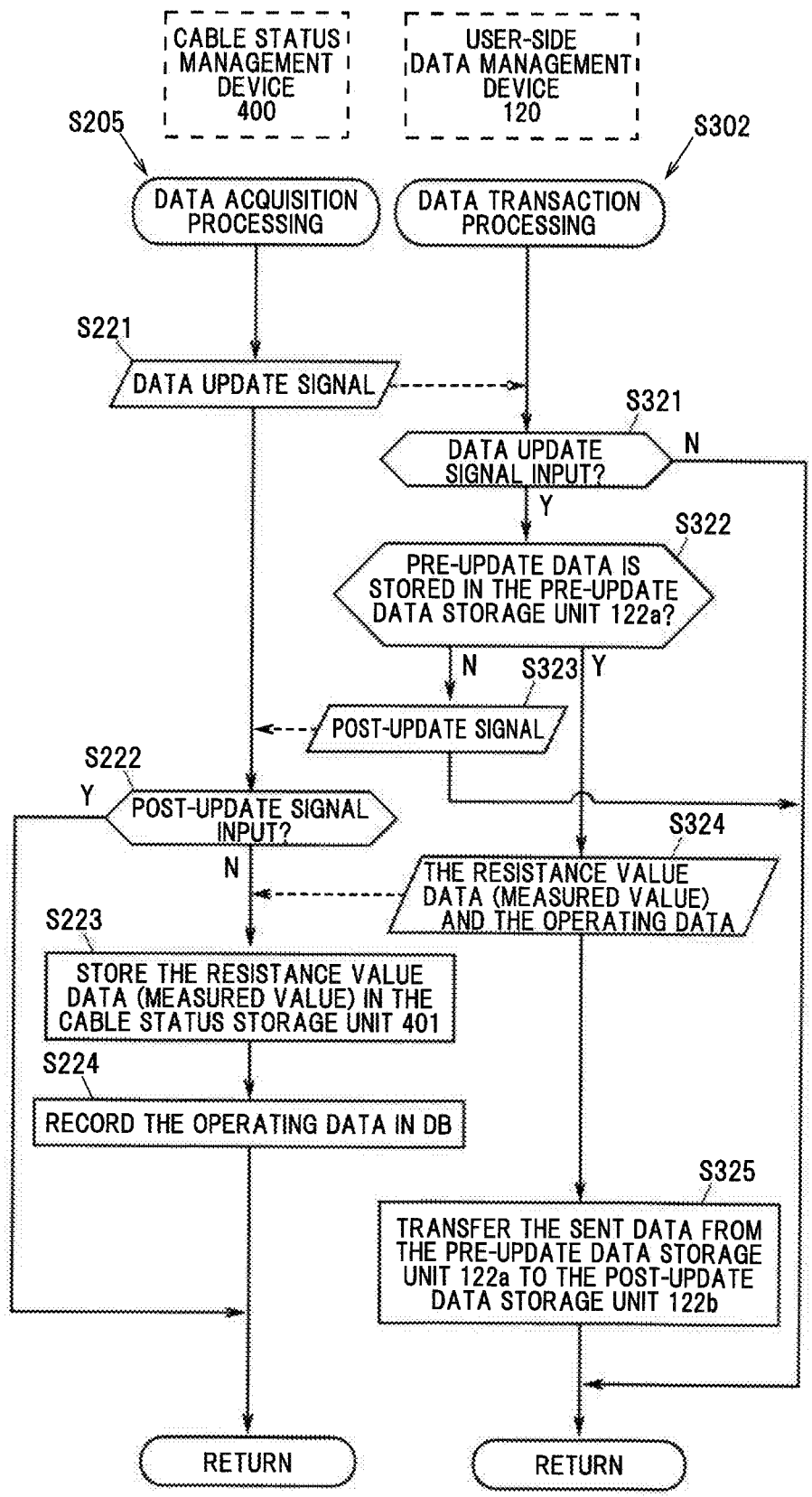
FIG. 9 is a flowchart of a data acquisition processing.

As shown in FIG. 9, in the data acquisition processing in step S205, the data acquisition processing unit 404 of the cable status management device 400 first sends a data update signal to the user-side data management device 120 which acquires the data (step S221).

The user-side data management device 120 performs the data transmission and reception processing (i.e., data transaction) in step S302 in parallel with the data acquisition processing. In this data transaction process, the user-side data management device 120 first determines whether the data update signal has been entered from the cable status management device 400 in step S321. If it is determined to be NO in step S321, the flow returns. If it is determined to be YES in step S321, then in step S322, it is determined whether any pre-update resistance value data (an actually measured value, i.e., data indicating the chronological change in the resistance value for which no frequency analysis has been performed) or the operating data is present in the pre-update data storage unit 122a. If it is determined to be NO in step S322, the cable status management device 400 sends an updated signal in step S323, and the flow returns. If it is determined to be YES in step S322, the data stored in the pre-update data storage unit 122a (the resistance value data (measured value) or the operating data) is sent to the cable status management device 400 in step S324. Thereafter, in step S325, the user-side data management device 120 transfers the resistance value data (measured value) or the operating data being sent to the cable status management device 400 from the pre-update data storage unit 122a to the post-update data storage unit 122b and stores it as an updated data (i.e., post-update data) in the post-update data storage unit 122b. Then the flow returns.

The post-update data (the resistance value data (measured value) and the operating data) stored in the post-update data storage unit 122*b* is processed for compression processing or storing and/or deletion processing for a specified period of time by the post-update data storage unit 122*b*.

After returning to the data acquisition processing and sending the update signal in step S221, it is determined if the updated signal has been entered in step S222. If it is determined to be YES in step S222, no new resistance value data or operating data is present, so the flow returns without data acquisition.

If it is determined to be NO in step S222, after receiving the resistance value data and/or the operating data from the user-side data management device 120, the data acquisition processing unit 404 stores the received resistance value data in the cable status storage unit 401 in step S223. In the present embodiment, the actual measured value of the resistance value data is transmitted and received during the data acquisition process, but when frequency-analyzed resistance value data (the resistance value variable components of the operating frequency and its higher order frequency) are transmitted and received, the resistance value data is registered in the cable status database DB in step S223.

Thereafter, in step S224, the data acquisition processing unit 404 registers (records) the received operating data in the cable status database DB. In this case, a processing of extracting only the operating data necessary to manage the cable status may be performed, if appropriate. Then the flow returns.

(Wire-Break Progress Estimation Processing)

Figure 10:
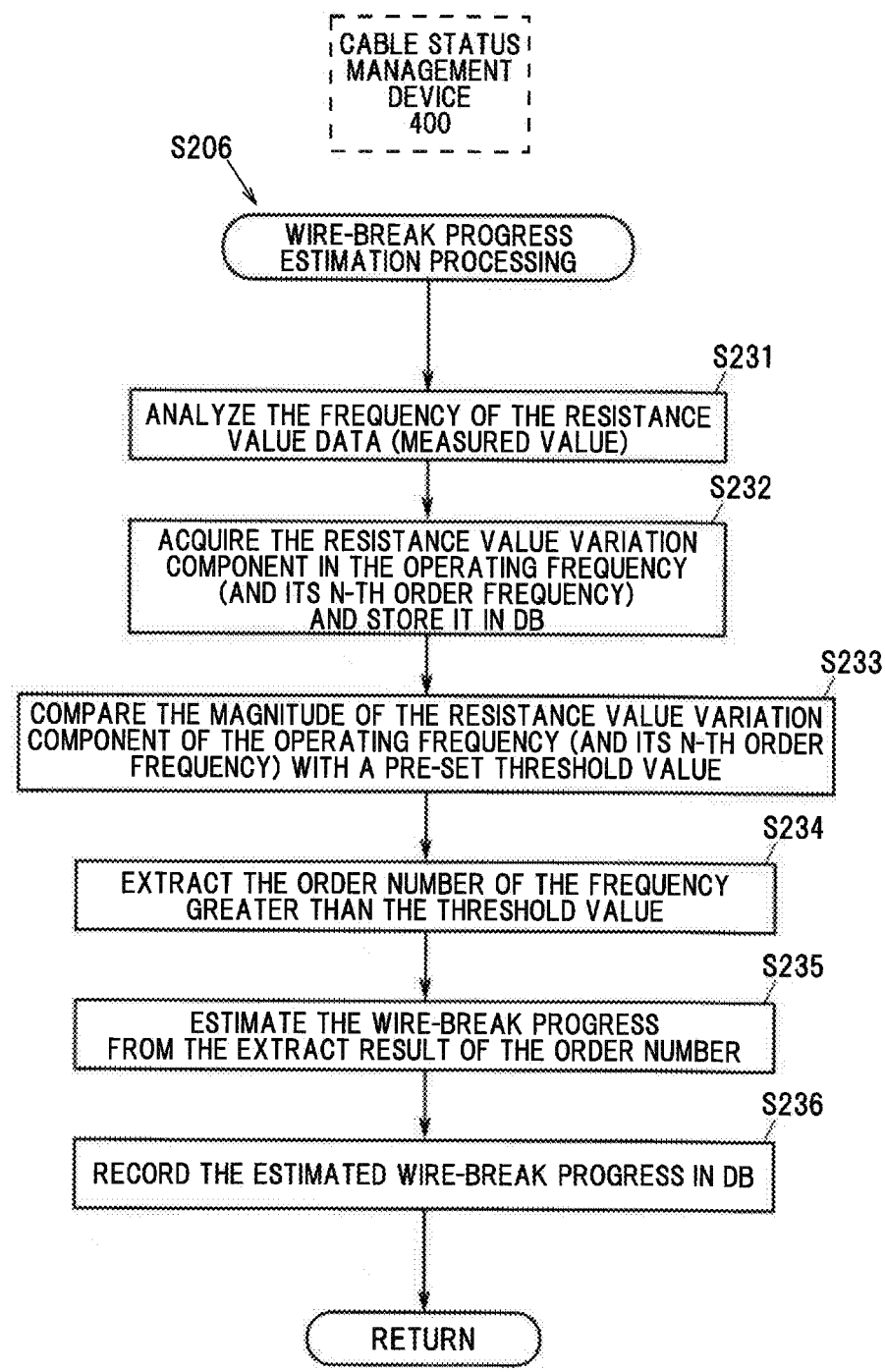
FIG. 10 is a flowchart of a wire-break progress estimation processing.

As shown in FIG. 10, in the wire-break progress estimation processing in step S206, firstly in step S231, the wire-break progress estimation processing unit 405 of the cable status management device 400 performs the frequency analysis of the resistance value data acquired during the data acquisition processing. In step S232, the resistance value variation components of the operating frequency and its high order frequency are acquired and registered in the cable status database DB. In addition, when the frequency analysis of the resistance value data is performed at the wire-break progress estimation processing unit 405, it is necessary to have some time-series data of the resistance values. Therefore, although it is not shown, but before performing step S231, it is preferable to perform a processing of confirming whether the resistance value data necessary for the frequency analysis has been acquired.

Then, in step S233, the magnitudes of the resistance value variation components of the operating frequency and its higher order frequency are compared with the pre-set threshold values, and in step S234, the order of frequencies above the threshold value is extracted. Then, in step S235, the wire-break progress (the percentage of wire-breaks of the metal strands in the conductor 21*a*) in cable 2 is estimated from the comparison results. Then, in step S236, the estimated wire-break progress status of the cable 2 is registered (or updated) as the wire-break progress data in the cable status database DB, and the flow returns.

Although it is not shown, the wire-break progress estimation processing unit 405 may be configured to send a notification signal to the user's terminal 130 of the corresponding robot user or to the robot manufacturer's terminal 201 of the robot manufacturer to notify that the wire-break progress data has been registered (or updated).

(Cable Life Prediction Processing)

Figure 11:
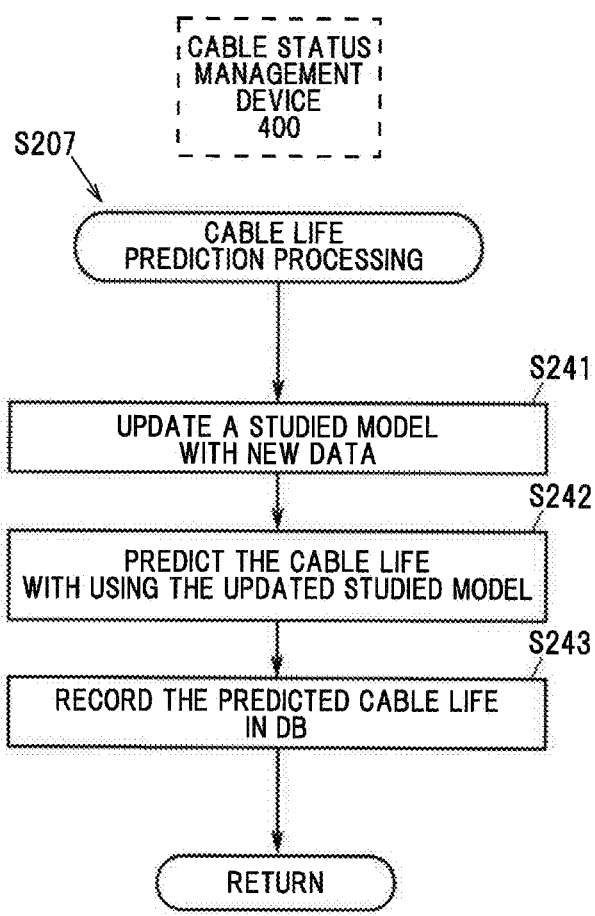
FIG. 11 is a flowchart of a cable life prediction processing.

As shown in FIG. 11, in the cable life prediction processing in step S207, firstly in step S241, the cable life prediction processing unit 406 of the cable status management device 400 updates the learned model with using machine learning based on the operating data acquired in step S205 and the wire-break progress data acquired in step S206. Then, in step S242, the life span (cable life) of the cable 2 is predicted with using the updated learned model. The predicted cable life of the cable 2 is then registered (or updated) as the cable life prediction data in the cable status storage unit 401, and the flow returns.

Although it is not shown, the cable life prediction processing unit 406 may be configured to send a notification signal to the user's terminal 130 of the corresponding robot user or to the robot manufacturer's terminal 201 of the robot manufacturer to notify that the cable life prediction data has been registered (or updated).

(Data Output Processing)

Figure 12:
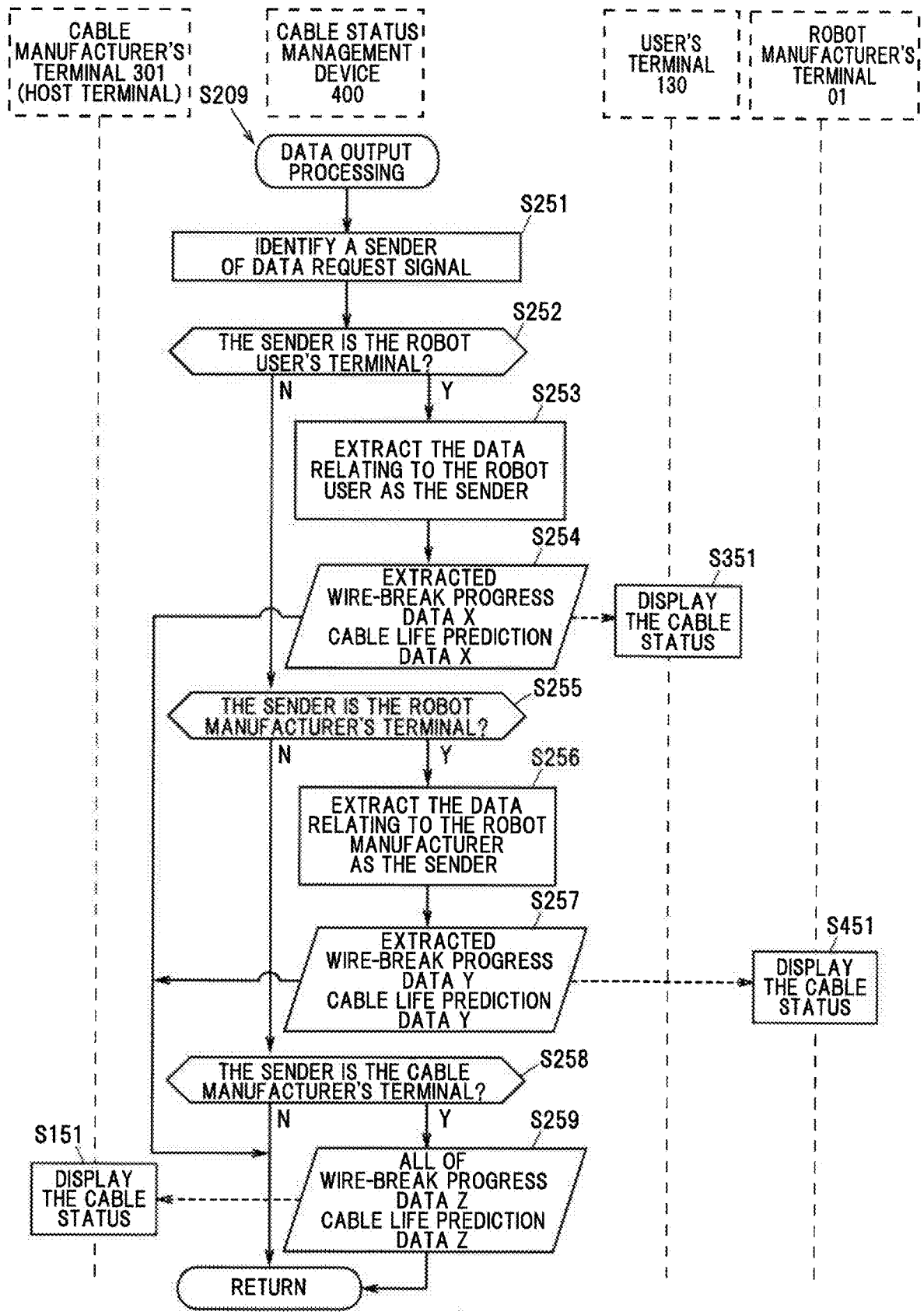
FIG. 12 is a flowchart of a data output processing.

As shown in FIG. 12, in the data output processing in step S209, firstly in step S251, the access restriction processing unit 407 of the cable status management device 400 identifies the sender (i.e., the source) of the data request signal that is entered. For example, the sender can be identified by using an IP address of the source, the ID at login, etc., as appropriate. Then, in step S252, it is determined if the source identified in step S251 is the user's terminal 130 or not. If it is determined to be YES in step S252, in step S253, the data X (data X requested, such as wire-break progress data X and cable life prediction data X) of the cable 2 related to the robot user as the sender is extracted from the cable status database DB. Then, in step S254, the data X extracted in step S253 is sent to the user's terminal 130. Then the flow returns. The robot user receives the wire-break progress data X and the cable life prediction data X at the user's terminal 130. At this time, the wire-break progress data X and the cable life prediction data X are displayed in a display of the user's terminal 130 (step S351). The robot user performs predictive maintenance (i.e., replacing the managed cable, etc.) of the industrial robot 110 with using the received data.

The predictive maintenance of the industrial robots 110 may be carried out as necessary, based on the received data.

If it is determined to be NO in step S252, in step S255, it is determined if the source identified in step S251 is the robot manufacturer's terminal 201. If it is determined to be YES in step S255, in step S256, the data Y (data Y requested, such as wire-break progress data Y and cable life prediction data Y) of the cable 2 related to the robot manufacturer as the sender is extracted from the cable status database DB. At this time, for example, it may be configured to extract the data only for a specific robot user (but only for the robot user using the industrial robot 110 manufactured by the robot manufacturer as the sender). In step S257, the data Y extracted in step S256 is sent to the robot manufacturer's terminal 201. Then the flow returns. The robot manufacturer receives the wire-break progress data Y and the cable life prediction data Y at the robot manufacturer's terminal 201. At this time, the wire-break progress data Y and the cable life prediction data Y are displayed in a display of the robot manufacturer's terminal 201 (step S451). The robot manufacturer performs predictive maintenance (i.e., replacing the managed cable, etc.) of the industrial robots 110 of each robot user with using the received data or support the implementation of the predictive maintenance. The predictive maintenance of the industrial robots 110 or the support of the predictive maintenance may be carried out as necessary, based on the received data.

If it is determined to be NO in step S255, in step S258, it is determined if the source identified in step S251 is the cable manufacturer's terminal 301. If no is determined in step S258, the source is not a user's terminal 130, a robot manufacturer's terminal 201, or a cable manufacturer's terminal 301, so it returns without any data output. If it is determined to be NO in step S258, the source is neither the user's terminal 130, the robot manufacturer's terminal 201, nor a cable manufacturer's terminal 301, so the flow returns without any data output. If it is determined to be YES in step S258, in step S259, all the data Z (such as wire-break progress data Z and cable life prediction data Z) I the cable status database DB is sent to the cable manufacturer's terminal 301. At this time, for example, it may be configured to send the data only for a specific robot user or a specific robot manufacturer. Then the flow returns. The cable manufacturer receives the wire-break progress data Z and the cable life prediction data Z at the cable manufacturer's terminal 301. At this time, the wire-break progress data Z and the cable life prediction data Z are displayed in a display of the cable manufacturer's terminal 301 (step S151).

After the data output processing in FIG. 12 (step S209), it may be configured to perform a reset processing. During the reset process, when the managed cable (the cable 2) is replaced, the cable status storage unit 401 stores the replacement information that the managed cable has been replaced. In the reset process, it is also preferable to keep the data related to the managed cable that was wired before the replacement as an old data without deleting it from the cable status storage unit 401. For example, this old data can be used for machine learning and the like to acquire the wire-break progress data and the cable life prediction data for other managed cables. In addition, after the reset processing has been performed at the reset processing unit, the setting processing may be carried out regarding the managed cable newly wired in the managed device.

(Operation of the Cable Status Management System 1)

The service to be implemented using the cable status management system 1 described above (hereinafter referred to as "cable status management service") is basically provided by the cable manufacturer. The robot manufacturers and the robot users conclude contracts with the cable manufacturer for the provision of services and pay the cable manufacturer for the services provided. For example, it is possible to set a monthly fee according to the number of the cables 2 for which the cable status management is carried out, and to set a fee according to the number of provided data, which is the number of data provided, such as the wire-break progress data and the cable life prediction data.

(Functions and Effects of the Embodiment)

As explained above, the cable status management system 1 according to the present embodiment comprises the cable status management device 400 having the cable status storage unit 401 that stores the wire-break progress data indicating the wire-break progress in the cable 2, the user-side data management device 120 that belongs to the robot user who uses the industrial robot 110 and that manages the main data for estimating the wire-break progress in the cable 2, the robot manufacturer's terminal 201 that belongs to the robot manufacturer that manufactures the industrial robot 110, and the cable manufacturer's terminal 301 that belongs to the cable manufacturer that manufactures the cable 2, in which the user-side data management device 120, the robot manufacturer's terminal 201, and the cable manufacturer's terminal 301 are connected to the cable status management device 400 via the network 500, and at least the robot manufacturer's terminal 201 and the cable manufacturer's terminal 301 are configured to be accessible with the wire-break progress data stored in the cable status storage unit 401.

This configuration enables not only the robot users, but also the robot manufacturers and the cable manufacturer to control the wire-break progress in the cable 2 accurately from remote locations, and enables the robot users, the robot manufacturers, and the cable manufacturer to manage the wire-break progress in the cable 2 graciously. As a result, the robot manufacturers and the cable manufacturers can also take safety measures, such as monitoring the wire-break progress in the cable 2 and prompting the cable 2 to be replaced as appropriate in response to the wire-break progress, thereby effectively suppressing the failure of the industrial robot 110 due to the failure of the cable 2.

Conventionally, various attempts have been made to accumulate Internet of things (IoT) data on the field of the industrial robot 110 to estimate the wire-break progress in the cable 2 and predict the cable life of the cable 2. However, for various reasons, it has not been practical. According to the present embodiment, the data relating to the status (the resistance value data, the operating data, etc.) of the cable 2 can be easily collected and accumulated across multiple robot users or multiple robot manufacturers, and it is possible to use the accumulated data to accurately estimate the wire-break progress in the cable 2 and predict the cable life of the cable 2 even at remote locations.

(Modified Examples)

In the present embodiment, the resistance value data of the cable 2 was actually measured and the wire-break progress in the cable 2 was estimated based on the actual measured data. However, it is possible to configure the cable 2 to estimate the wire-break progress based solely on the operating data, without measuring the resistance value data of the cable 2. In this case, it is possible to construct a highly accurate, learned model (a learned model of the wire-break progress data with respect to the operating data) in advance at the cable life prediction processing unit 406, and then use this learned model to estimate the wire-break progress in the cable 2 from the operating data. It is also possible to configure the system in such a manner both the robot user that measures the resistance value data (i.e., the industrial robot 110 has a resistance value detecting unit 150) and the robot user that measures only the operating data (the industrial robot 110 does not have the resistance value detecting unit 150) are connected to the cable status management device 400 via the network 500, and the method for estimating the wire-break progress can be set in accordance with the data to be input. This configuration may include the robot users who do not measure the operating data. The resistance value data used to estimate the wire-break progress in the cable 2 and to predict the cable life of the cable 2 may be the resistance values detected in the workpieces other than the conductor 21*a* constituting the cable 2.

In the above embodiment, the resistance value data and the operating data are entered only from the user-side data management device 120 to the cable status management device 400. However, the present invention is not limited thereto. It may be configured in such a manner that the resistance value data and the operating data can be entered from the robot manufacturer's terminal 201 or the cable manufacturer's terminal 301 to the cable status management device 400. For example, it is possible to carry out data input from the robot manufacturer's terminal 201 or the cable manufacturer's terminal 301 after taking back the measured resistance value data and the operating data from the robot manufacturers and the cable manufacturer, and to process the data as appropriate, thereby improving the convenience.

Further, in the above embodiment, the managed device being wired with the managed cable, for which the wire-break progress is managed, is the industrial robot 110. However, the managed device is not limited to the industrial robot 110. In other words, the device to which the cable 2 is applied should be a device being applied with the cable (the managed cable) which receives repeated operations such as bending, twisting, oscillation. For example, the managed device may be a plant facility other than the industrial robot 110, or an automobile or the like. Particularly, in recent years, some vehicles have been able to perform the communication via the Internet, and they can be configured to transmit the resistance value data and the operating data to the cable status management device 400 using such communication. For example, in the case of the vehicles, the present invention may be applied to the undercarriage cables (for example, electric parking cables, ABS sensor cables, electric brake cables), and they may be configured to measure the resistance value data of the cables that are subjected to periodic oscillations when the vehicle is subjected to cyclical vibrations (for example, vibrations when driving on a highway). In this case, the frequency corresponding to the frequency of the vibration (the period during which the cable oscillates) is equivalent to the operating frequency. Therefore, by extracting the resistance value variation components of the operating frequency and its high-order frequency from the measured resistance value data and comparing the magnitude of each of the resistance value variation components with the threshold value, it is possible to estimate the wire-break progress in the cable.

Furthermore, in the present embodiment, the robot user's site 100 has a separate configuration of the user's terminal 130 and the user-side data management device 120. However, the user's terminal 130 and the user-side data management device 120 may be configured as one piece. In addition, the robot control device 112 attached to the industrial robot 110 may be connected directly to the cable status management device 400 via the network 500. In this case, the function of the user-side data management device 120 will be installed in the robot control device 112 (i.e., the robot control device 112 combines its original function and the function of the user-side data management device 120).

In the above embodiment, the cable manufacturer manages the cable status management device 400. However, the management of the cable status management device 400 may be performed by a specialty contractor other than the cable manufacturer.

(Summary of the Embodiment)

Next, the technical concept grasped from the above-described embodiment is described with reference to the signs or the like in the embodiment. However, each sign or the like in the following description is not limited to a member or the like specifically showing the elements in the following claims in the embodiment.

According to the feature [1], a cable status management system 1 for managing a wire-break progress of a cable 2 used in a managed device 110, includes a cable status management device 400 having a cable status storage unit 401 that stores a wire-break progress data indicating the wire-break progress in the cable 2, a device user-side data management device 120 that belongs to a device user that uses the managed device 110, a device manufacturer terminal 201 that belongs to a device manufacturer that manufactures the managed device 110, and a cable manufacturer terminal 301 that belongs to a cable manufacturer that manufactures the cable 2, in which the device user-side data management device 120, the device manufacturer terminal 201, and the cable manufacturer terminal 301 are connected to the cable status management device 400, and at least the device manufacturer terminal 201 and the cable manufacturer terminal 301 are configured to be accessible with the wire-break progress data stored in the cable status storage unit 401 via a network 500.

According to the feature [2], the cable status management system 1 as described in the feature [1] further includes a resistance value detecting unit 150 configured to be able to detect a chronological change in a resistance value of the cable 2 when the cable 2 is repeatedly operated in a cyclic manner, in which the device user-side data management device 120 has a storage unit 122 that stores a resistance value data as a detection result of the resistance value detecting unit 150, in which the cable status management device 400 has a data acquisition processing unit 404 that acquires the resistance value data stored in the storage unit 122 of the device user-side data management device 120, in which the wire-break progress in the cable 2 is estimated based on the resistance value data acquired by the data acquisition processing unit 404.

According to the feature [3], in the cable status management system 1 as described in the feature [2], the cable status management device 400 further includes a wire-break progress estimation processing unit 405 that estimates the wire-break progress in the cable 2 at least based on a magnitude of a resistance value variation component of an operating frequency in the resistance value data, where the operating frequency is a frequency for operating the cable 2 repeatedly in the cyclic manner.

According to the feature [4], in the cable status management system 1 as described in the feature [2] or [3], the resistance value detecting unit 150 is mounted on the managed device 110 or a control device 112 of the managed device 110, which is attached to the managed device 110, and the resistance value detecting unit 150 is configured to be able to output the resistance value data to the device user-side data management device 120.

According to the feature [5], in the cable status management system 1 as described in the any one of features [2] to [4], the device user-side data management device 120 is configured to store an operating data which is a data of an operating status of the cable 2 in the storage unit 122, in which the data acquisition processing unit 404 of the cable status management device 400 is configured to acquire the operating data stored in the storage unit 122 of the device user-side data management device 120, in which the cable status management device 400 has a cable life prediction processing unit 406 that performs machine learning based on the operating data and the wire-break progress data to predict a life of the cable 2 and stores the predicted life of the cable 2 as a cable life prediction data in the cable status storage unit 401, in which at least the device manufacturer terminal 201 and the cable manufacturer terminal 301 are configured to be accessible with the cable life prediction data stored in the cable status storage unit 401.

According to the feature [6], in the cable status management system 1 as described in the any one of features [1] to [5], the device manufacturer terminals 201, each of which belongs to a different device manufacturer, are connected to the cable status management device 400 via the network 500, in which the cable status management device 400 has an access restriction processing unit 407 that performs an access restriction to each of the device manufacturer terminals 201 in such a manner that only the wire-break progress data of the cable 2 for the managed device 110 manufactured by the device manufacturer to which the device manufacturer terminal 201 belongs is accessible.

According to the feature [7], in the cable status management system 1 as described in the any one of features [1] to [5], the access restriction processing unit 407 permits the cable manufacturer terminal 301 to access the wire-break progress data from all the device manufacturers.

According to the feature [8], in the cable status management system 1 as described in the any one of features [1] to [7], the managed device 110 is an industrial robot 110, and the device manufacturer is a robot manufacturer that manufactures the industrial robot 110.

As described above, the embodiment of the present invention is explained, but the embodiment described above does not limit the invention according to the scope of claims. In addition, it should be noted that not all of the combinations of characteristics features described in the embodiment are necessary as means for solving the problems of the invention. The present invention can also be implemented by being modified appropriately without deviating from its intended purpose.

The invention claimed is:

1. A cable status management system for managing a wire-break progress of a cable used in a managed device, comprising:
    a cable status management device having a cable status storage unit that stores a wire-break progress data indicating the wire-break progress of the cable;
    a device user-side data management device of a device user that uses the managed device;
    a device manufacturer terminal of a device manufacturer that manufactures the managed device; and
    a cable manufacturer terminal of a cable manufacturer that manufactures the cable,
    wherein at least the device manufacturer terminal and the cable manufacturer terminal are configured to be accessible with the wire-break progress data stored in the cable status storage unit via a network.

2. The cable status management system according to claim 1, further comprising:
    a resistance value detecting unit configured to be able to detect a chronological change in a resistance value of the cable when the cable is repeatedly operated in a cyclic manner,
    wherein the device user-side data management device has a storage unit that stores a resistance value data as a detection result of the resistance value detecting unit,
    wherein the cable status management device has a data acquisition processing unit that acquires the resistance value data stored in the storage unit of the device user-side data management device, and
    wherein the wire-break progress of the cable is estimated based on the resistance value data acquired by the data acquisition processing unit.

3. The cable status management system according to claim 2, wherein the cable status management device further comprises a wire-break progress estimation processing unit that estimates the wire-break progress of the cable at least based on a magnitude of a resistance value variation component of an operating frequency in the resistance value data, where the operating frequency is a frequency for operating the cable repeatedly in the cyclic manner.

4. The cable status management system according to claim 2, wherein the resistance value detecting unit is mounted on the managed device or a control device of the managed device, which is attached to the managed device, and the resistance value detecting unit is configured to be able to output the resistance value data to the device user-side data management device.

5. The cable status management system according to claim 2, wherein the device user-side data management device is configured to store an operating data which is a data of an operating status of the cable in the storage unit of the device user-side data management device,
    wherein the data acquisition processing unit of the cable status management device is configured to acquire the operating data stored in the storage unit of the device user-side data management device,
    wherein the cable status management device has a cable life prediction processing unit that performs machine learning based on the operating data and the wire-break progress data to predict a life of the cable and stores the predicted life of the cable as a cable life prediction data in the cable status storage unit, and
    wherein at least the device manufacturer terminal and the cable manufacturer terminal are configured to be accessible with the cable life prediction data stored in the cable status storage unit.

6. The cable status management system according to claim 1, wherein the device manufacturer is a first device manufacturer,
    wherein device manufacturer terminals, each of which is of a device manufacturer different from the first device manufacturer, are connected to the cable status management device via the network, and
    wherein the cable status management device has an access restriction processing unit that performs an access restriction to each of the device manufacturer terminals in such a manner that only the wire-break progress data of the cable for the managed device manufactured by the device manufacturer to which the device manufacturer terminal belongs is accessible.

7. The cable status management system according to claim 6, wherein the access restriction processing unit permits the cable manufacturer terminal to access the wire-break progress data from all device manufacturers.

8. The cable status management system according to claim 1, wherein the managed device comprises an industrial robot, and the device manufacturer comprises a robot manufacturer that manufactures the industrial robot.

9. The cable status management system according to claim 1, wherein the managed device comprises an automobile, and the device manufacturer comprises an automobile manufacturer that manufactures the automobile.

* * * * *